(12) United States Patent
Sakata

(10) Patent No.: US 7,035,726 B2
(45) Date of Patent: Apr. 25, 2006

(54) STEERING CHARACTERISTIC CONTROL APPARATUS AND METHOD FOR A VEHICLE

(75) Inventor: Kunio Sakata, Tokyo (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 0 days.

(21) Appl. No.: 11/072,637

(22) Filed: Mar. 7, 2005

(65) Prior Publication Data

US 2005/0216157 A1    Sep. 29, 2005

(30) Foreign Application Priority Data

Mar. 25, 2004   (JP)   ............... 2004-090282

(51) Int. Cl.
G06F 17/00 (2006.01)
B60J 8/32 (2006.01)

(52) U.S. Cl. ............................. 701/72; 701/73; 701/80; 180/410; 180/421; 180/422; 180/443; 180/446; 303/148; 303/189

(58) Field of Classification Search ................ 303/146, 303/148, 189–190; 701/72–73, 41–42; 180/410, 180/421, 443, 446

See application file for complete search history.

(56) References Cited

U.S. PATENT DOCUMENTS

| | | | | |
|---|---|---|---|---|
| 4,669,745 | A | * | 6/1987 | Miki et al. .................. 180/410 |
| 4,720,790 | A | * | 1/1988 | Miki et al. ..................... 701/41 |
| 4,774,667 | A | * | 9/1988 | Kuraoka et al. ............... 701/78 |
| 4,998,593 | A | * | 3/1991 | Karnopp et al. ............ 180/408 |

(Continued)

FOREIGN PATENT DOCUMENTS

JP    3257354    1/1997

(Continued)

OTHER PUBLICATIONS

Nakamura Mitsuru et al., System for the forecast of the behavior of a motor vehicle and for the controlling of such behavior, Japanese Patent 914242 with priority Jan. 18, 2001, (from DialogClassic Web(tm) File 324, acc. No. 0002835098).*

(Continued)

Primary Examiner—Cuong Nguyen
(74) Attorney, Agent, or Firm—Jacobson Holman PLLC

(57) ABSTRACT

A steering characteristic control apparatus and method for a vehicle is disclosed which can carry out behavior control of the vehicle regarding a steering characteristic and so forth appropriately in accordance with the type of turning and the road surface situation. To this end, if the steering characteristic of the vehicle is placed into an oversteer or understeer state exceeding a reference level, then the control end condition when the steering characteristic is controlled to the neutral steer side by control of a braking mechanism is set in accordance with an estimated road surface μ state and the type of turning (steady turning or non-steady turning) of the vehicle. Upon steady turning, during traveling on a low μ road, it is set as the control end condition that the stability of the vehicle behavior is restored sufficiently, but during traveling on a high μ road, it is set as the condition that the stability of the vehicle behavior is restored to some degree so that the control can be ended rapidly. Upon non-steady turning, the condition is set such that the stability of the vehicle behavior is higher than that upon steady turning during traveling on a high μ road but lower than that upon steady turning during traveling on a low μ road.

12 Claims, 11 Drawing Sheets

U.S. PATENT DOCUMENTS

| | | | |
|---|---|---|---|
| 5,089,967 A * | 2/1992 | Haseda et al. | 701/78 |
| 5,150,298 A * | 9/1992 | Fujioka et al. | 701/79 |
| 5,225,765 A * | 7/1993 | Callahan et al. | 323/235 |
| 5,408,411 A * | 4/1995 | Nakamura et al. | 701/48 |
| 5,418,727 A * | 5/1995 | Ikeda et al. | 701/96 |
| 5,502,639 A * | 3/1996 | Fukunaga et al. | 701/41 |
| 5,589,815 A * | 12/1996 | Nishihara et al. | 340/444 |
| 5,627,754 A * | 5/1997 | Asanuma et al. | 701/41 |
| 5,636,121 A * | 6/1997 | Tsuyama et al. | 701/70 |
| 5,700,073 A * | 12/1997 | Hiwatashi et al. | 303/146 |
| 5,707,120 A * | 1/1998 | Monzaki et al. | 303/146 |
| 5,729,107 A * | 3/1998 | Shimizu et al. | 318/489 |
| 5,733,019 A * | 3/1998 | Inagaki et al. | 303/146 |
| 5,782,543 A * | 7/1998 | Monzaki et al. | 303/146 |
| 5,799,261 A * | 8/1998 | Ozaki et al. | 701/78 |
| 5,799,745 A * | 9/1998 | Fukatani | 180/410 |
| 5,839,798 A * | 11/1998 | Monzaki et al. | 303/146 |
| 5,862,503 A * | 1/1999 | Eckert et al. | 701/78 |
| 5,947,221 A * | 9/1999 | Taniguchi et al. | 180/197 |
| 6,026,343 A * | 2/2000 | Ogino | 701/72 |
| 6,053,583 A * | 4/2000 | Izumi et al. | 303/150 |
| 6,059,688 A * | 5/2000 | Nozaki et al. | 477/97 |
| 6,064,931 A * | 5/2000 | Sawada et al. | 701/41 |
| 6,074,020 A * | 6/2000 | Takahashi et al. | 303/146 |
| 6,092,882 A * | 7/2000 | Matsuno | 303/146 |
| 6,155,655 A * | 12/2000 | Matsuno | 303/146 |
| 6,158,826 A * | 12/2000 | Yasuda | 303/191 |
| 6,208,929 B1 * | 3/2001 | Matsuno et al. | 701/89 |
| 6,219,609 B1 * | 4/2001 | Matsuno et al. | 701/72 |
| 6,236,926 B1 * | 5/2001 | Naitou | 701/70 |
| 6,272,418 B1 * | 8/2001 | Shinmura et al. | 701/72 |
| 6,289,281 B1 * | 9/2001 | Shinmura et al. | 701/301 |
| 6,339,739 B1 * | 1/2002 | Folke et al. | 701/70 |
| 6,360,150 B1 * | 3/2002 | Fukushima et al. | 701/41 |
| 6,409,287 B1 * | 6/2002 | Leach et al. | 303/146 |
| 6,435,626 B1 * | 8/2002 | Kostadina | 303/139 |
| 6,449,542 B1 * | 9/2002 | Bottiger et al. | 701/41 |
| 6,463,378 B1 * | 10/2002 | Nishio | 701/70 |
| 6,588,858 B1 * | 7/2003 | Ritz et al. | 303/140 |
| 6,598,946 B1 * | 7/2003 | Nagae | 303/190 |
| 6,654,674 B1 * | 11/2003 | Lu et al. | 701/36 |
| 6,691,017 B1 * | 2/2004 | Banno et al. | 701/84 |
| 6,895,317 B1 * | 5/2005 | Yasui et al. | 701/36 |
| 6,941,212 B1 * | 9/2005 | Sakata | 701/72 |
| 2004/0019417 A1 * | 1/2004 | Yasui et al. | 701/36 |
| 2004/0099469 A1 * | 5/2004 | Koibuchi et al. | 180/421 |
| 2005/0102085 A1 * | 5/2005 | Sakata | 701/72 |
| 2005/0216157 A1 * | 9/2005 | Sakata | 701/42 |

FOREIGN PATENT DOCUMENTS

| | | | |
|---|---|---|---|
| JP | 09-224539 | * | 8/1997 |
| JP | 99/56994 | * | 1/2000 |
| JP | 2000088609 | * | 3/2000 |
| JP | 2000104577 | * | 4/2000 |
| JP | 2000104582 | * | 4/2000 |

OTHER PUBLICATIONS

Hiroaki Kato et al., Vehicle control device with power steering device, Japanese patent 020329 with priority Mar. 29, 2002 (from DialogClassic Web(tm) File348, acc. No. 01637298).*

* cited by examiner

IN OVERSTEER STATE

IN UNDERSTEER STATE

STEERING CHARACTERISTIC CONTROL APPARATUS AND METHOD FOR A VEHICLE

BACKGROUND OF THE INVENTION

1. Field of the Invention

This invention relates to a steering characteristic control apparatus for controlling the characteristic of a vehicle such as oversteer or understeer upon turning, and more particularly to a steering characteristic control apparatus for a vehicle which aims at a condition for ending control.

2. Description of Background

As one of techniques for controlling the behavior of a vehicle upon turning, a technique has been developed wherein braking force is applied to a particular wheel of a vehicle upon turning to control the steering characteristic of the vehicle to correct the posture of the vehicle upon turning in the turning direction to achieve stabilization in traveling of the vehicle and is disclosed, for example, in Japanese Patent No. 3, 257, 354 (hereinafter referred to as Patent Document 1).

According to the technique disclosed in Patent Document 1, when the oversteer of the vehicle upon turning is strong, the vehicle excessively turns to the inner side of turning and also the traveling path is displaced excessively to the inner side of turning, resulting in the possibility of spinning of the vehicle. Therefore, braking force is applied to turning outer wheels to suppress excessive turning round of the vehicle to the inner side of turning thereby to prevent the traveling path from being displaced to the inner side of turning (that is, to suppress the oversteer).

In this instance, if braking force is applied only to a front wheel from between the turning outer wheels, then the oversteer can be suppressed smoothly and efficiently without excessively slowing down the vehicle.

Further, when the oversteer is strong while a braking operation is performed during turning, either the braking force to the turning outer side front wheel is increased or the braking force to the turning outer side front wheel is increased and the braking force to the turning inner side rear wheel is decreased.

On the other hand, when the understeer of the vehicle upon turning is strong, the vehicle is less liable to be turned round to the inner side of turning and also the traveling path is liable to swerve to the outer side of turning, resulting in the possibility of a drift-out. Therefore, braking force is applied to turning inner wheels to cause the vehicle to turn round to the turning direction thereby to prevent the traveling path from being displaced to the outer side of turning (that is, to suppress the understeer).

In this instance, if braking force is applied only to a rear wheel from between the turning inner wheels, then the understeer can be suppressed smoothly and efficiently without excessively slowing down the vehicle.

Further, when the understeer is strong while a braking operation is performed during turning, either the braking force to the turning inner side rear wheel is increased or the braking force to the turning inner side rear wheel is increased and the braking force to the turning outer side front wheel is decreased.

Incidentally, according to the technique of Patent Document 1, while the behavior of a vehicle regarding the steering characteristic is controlled by applying braking force to the wheels, this is intended not only to achieve stabilization of the behavior of the vehicle regarding the steering characteristic by applying the braking force to the wheels but also to stabilize the behavior of the vehicle efficiency by applying braking force to a particular wheel (or increasing or decreasing the braking force) to generate a moment for stabilizing the behavior of the vehicle. In other words, according to the steering characteristic control, the behavior of the vehicle can be stabilized by applying a moment acting to cause the steering characteristic to approach the neutral steer.

In contrast, if it is intended to merely slow down the vehicle, also suppression of the output power for driving of the vehicle (that is, the engine torque) is applicable. For example, Japanese Patent Laid-Open No 2000-104582 (hereinafter referred to as Patent Document 2) discloses a technique wherein, if the behavior of a vehicle becomes unstable, then the fuel supply to the engine is intercepted to reduce the engine torque.

Where the behavior of a vehicle regarding the steering characteristic is controlled as described above, the control apparatus is usually configured such that it refers to a parameter value relating to the stability of the behavior of the vehicle and starts control when the parameter value representative of the behavior stability becomes lower than a control start reference value, whereafter the control is ended when the parameter value representative of the behavior stability of the vehicle exceeds a control end reference value.

The parameter value in this instance may be, for example, where it is used for the steering characteristic control, a yaw rate deviation calculated by subtracting a detected yaw rate (actual yaw rate) from a theoretical yaw rate (target yaw rate) determined from a traveling state and an operation state of the vehicle or may be a lateral acceleration acting on the vehicle.

As described above, in the behavior control by the steering characteristic control of a vehicle, the brake or the engine output power of the vehicle is controlled in order to secure the behavior stability of the vehicle. However, the brake or the engine output power of the vehicle should originally be controlled in accordance with the intention (operation) of the driver. Accordingly, the behavior control of the vehicle which is carried out independently of the intention of the driver should naturally be carried out only when it is required. In this regard, it is significant to set a control start condition and a control end condition such as a control start reference value and a control end reference value to appropriate values.

In the case of the control end condition, an end of control is determined from a state of the vehicle while the control is being carried out. However, even if the behavior of the vehicle is sufficiently stable while the control is being carried out, when the control is ended in this state, the behavior of the vehicle may sometimes be placed into an unstable state. In this instance, not only the behavior stability of the vehicle cannot be secured, but also control hunting takes place unfavorably. Accordingly, the control system is desirably configured such that, if the behavior stability of the vehicle cannot be secured when the behavior control of the vehicle is ended, then the control is continued, but if the behavior stability of the vehicle can be secured even if the behavior control of the vehicle is ended, then the control is ended rapidly.

Incidentally, the behavior stability of a vehicle is generally influenced by the state of the road surface of a road on which the vehicle travels, that is, by the coefficient of friction of the road surface. In particular, when the road surface is slippery (that is, when the road has a low μ), it is difficult to secure the behavior stability of the vehicle, but when the road surface is not slippery (that is, when the road has a high µ), it is easy to secure the behavior stability of the vehicle.

Also the behavior stability of the vehicle after the end of the control can usually be secured readily on a high µ road but can be secured less readily on a low µ road. Therefore, if the control end condition for a high µ road is set to a condition with which the behavior stability of the vehicle is comparatively low and the control end condition for a low µ road is set to another condition with which the behavior stability of the vehicle is comparatively high, then an end of the control can be determined further appropriately.

Meanwhile, turning of a vehicle which makes an object of behavior control of the vehicle can be classified roughly into unsteady or transient turning upon lane change or emergency avoiding steering which involves sudden changeover of the turning direction (such turning is hereinafter referred to also as lane change turning) and steady turning (hereinafter referred to also as simple turning) such as turning along a loop bridge or the like along which turning in the same direction continues and turning along a moderate S-shaped curve.

The simple turning is liable to be influenced by the road surface µ, and preferably the control end condition is configured such that, for a high µ road, it is set to such a low condition that the behavior stability is improved a little so that the behavior control may end at a point of time when the behavior of the vehicle is stabilized a little, but for a low µ load, it is set to such a high condition that the behavior stability is sufficiently high so that the behavior control may end at a point of time when the behavior of the vehicle is stabilized sufficiently.

On the other hand, upon lane change turning, changeover of the steering angle is performed suddenly, and also the turning round of the vehicle is likely to be performed suddenly. Therefore, a parameter value representative of the stability of the behavior of a vehicle is liable to be displaced to the unstable side. On the other hand, upon lane change turning, straightforward traveling is restored rapidly after a steering operation. Consequently, the behavior of the vehicle is liable to be stabilized after the control is ended. Therefore, if the control end condition for the lane change turning is set similarly to that for the simple turning, then a malfunction occurs.

In particular, if the control end condition when the vehicle runs on a high µ road upon simple turning (condition of such a degree that the behavior stability is improved only a little) is adopted as the control end condition for high µ road traveling, then the end of the control may be excessively earlier. In this instance, after the control ends once, the behavior stability of the vehicle drops, and the control start condition is established again and also the control itself is placed into instability.

On the other hand, if the control end condition upon low µ road traveling upon simple turning (a condition where the behavior stability is increased sufficiently) adopted as the control end condition upon low µ road traveling upon lane change turning, then the control continues for an unnecessarily long period of time, and this gives rise to such a malfunction that the vehicle is slowed down unnecessarily.

SUMMARY OF THE INVENTION

It is an object of the present invention to provide a steering characteristic control apparatus for a vehicle which can carry out behavior control of the vehicle regarding a steering characteristic and so forth appropriately in accordance with the type of turning and the road surface situation.

In order to attain the object described above, according to an aspect of the present invention, there is provided a steering characteristic control apparatus for a vehicle, comprising a braking mechanism capable of braking left and right wheels of the vehicle separately from each other, steering characteristic determination means for estimating a steering characteristic of the vehicle upon turning of the vehicle, steering characteristic control means for starting, when it is determined by the steering characteristic determination means that the steering characteristic of the vehicle exhibits an excessive oversteer or understeer state exceeding a control start criterion, steering characteristic control of controlling the braking mechanism so as to apply braking force to one of the left and right wheels to adjust the steering characteristic to the neutral steering side and ending the steering characteristic control when it is determined by the steering characteristic determination means during the steering characteristic control that the steering characteristic of the vehicle is stabilized within a control end criterion on the neutral steering side with respect to the control start criterion, road surface µ determination means for determining a road surface µ state of a road surface of the road on which the vehicle travels, and turning determination means for determining whether turning of the vehicle is steady turning or non-steady turning represented by a lane change, a low µ road control end criterion for being used when it is determined by the turning determination means that the turning of the vehicle is the steady turning and the road surface µ estimation means estimates that the road surface is a low µ road, a high µ road control end criterion for being used when it is determined by the turning determination means that the turning of the vehicle is the steady turning and the road surface µ estimation means estimates that the road surface is a high µ road and a non-steady turning control end criterion for being used when it is determined by the turning determination means that the turning of the vehicle is the non-steady turning being provided as the control end criterion, the low µ road control end criterion, high µ road control end criterion and non-steady turning control end criterion having values relating to the vehicle behavior stability, the low µ road control end criterion being set to a value higher in the vehicle behavior stability than that of the high µ road control end criterion, the non-steady turning control end criterion being set to a value lower in the vehicle behavior stability than that of the low µ road control end criterion but higher in the vehicle behavior stability than that of the high µ road control end criterion.

With the steering characteristic control apparatus for a vehicle, if the steering characteristic of the vehicle is placed into an oversteer or understeer state exceeding the control start criterion, then the steering characteristic control of controlling the braking mechanism so as to apply braking force to one of the left and right wheels to adjust the steering characteristic to the neutral steer side is started. Then, if the steering characteristic determination means determines during the steering characteristic control that the steering characteristic of the vehicle is stabilized within the control end criterion on the neutral steer side, then the steering characteristic control is ended.

The determination of the end of the vehicle behavior control in this instance is performed, when the turning of the vehicle is steady turning and the road surface is a low µ road, using the low µ road control end criterion, but when the turning of the vehicle is steady turning and the road surface is a high µ road, the determination of the end of the vehicle behavior control is performed using the high μ road control end criterion. However, when the turning of the vehicle is non-steady turning, the determination of the end of the vehicle behavior control is performed using the non-steady turning control end criterion.

When the turning of the vehicle is steady turning (simple turning), the behavior of the vehicle is liable to be influenced by the road surface μ. However, in this instance, since the vehicle behavior stability of the low μ road control end criterion is set higher than the vehicle behavior stability of the high μ road control end criterion, if the road surface on which the vehicle travels is a low μ road, then the behavior control can be ended after it is waited that the behavior of the vehicle is stabilized sufficiently, but if the road surface on which the vehicle travels is a low μ road, then the behavior control can be ended at a point of time at which the behavior of the vehicle is stabilized a little. Consequently, while the behavior stability of the vehicle is secured, unnecessary behavior control can be eliminated thereby to quickly restore traveling of the vehicle which conforms with an operation of the driver.

On the other hand, when the turning of the vehicle is non-steady turning (such as lane change turning), the behavior of the vehicle is less liable to be influenced by the road surface μ, and if the low μ road control end criterion is set so as to assure a high degree of vehicle behavior stability similarly as in the case of steady turning (simple turning), then the control is continued although the behavior stability of the vehicle can originally be secured even if the control is ended. On the other hand, if the high μ road control end criterion is set so as to assure a low degree of vehicle behavior stability similarly as in the case of steady turning (simple turning), then the behavior stability of the vehicle drops if the control is ended. However, since the vehicle behavior stability of the non-steady turning control end criterion is set lower than the vehicle behavior stability of the low μ road control end criterion but higher than the vehicle behavior stability of the high μ road control end criterion, such malfunctions as described above can be prevented, and an end of the control can be determined appropriately.

Preferably, the steering characteristic control apparatus for a vehicle is configured such that, as the non-steady turning control end criterion for being used when it is determined by the turning determination means that the turning of the vehicle is the non-steady turning, a non-steady turning low μ road control end criterion for being used when the road surface μ estimation means estimates that the road surface of a low μ road and a non-steady turning high μ road control end criterion for being used when the road surface μ estimation means estimates that the road surface is a high μ road are provided, and the non-steady turning low μ road control end criterion is set to a value higher in the vehicle behavior stability than that of the non-steady turning high μ road control end criterion.

With the steering characteristic control apparatus for a vehicle, when the vehicle is traveling on a low μ road on which the behavior stability of the vehicle is relatively liable to drop, the control can be ended while the behavior stability of the vehicle is secured. Further, when the vehicle is traveling on a high μ road on which the behavior stability of the vehicle is relatively less liable to drop, the control can be ended rapidly while the behavior stability of the vehicle is secured.

Preferably, the steering characteristic control apparatus for a vehicle is configured such that, when the vehicle is in an excessive oversteer state, the steering characteristic control means performs, as the steering characteristic control, oversteer suppression control of controlling the braking mechanism so as to apply braking force to the wheel or wheels on the turning outer wheel side, but when the vehicle is in an excessive understeer state, the steering characteristic control means performs, as the steering characteristic control, understeer suppression control of controlling the braking mechanism so as to apply braking force to the wheel or wheels on the turning inner wheel side. With the steering characteristic control apparatus for a vehicle, the yaw moment of the vehicle can be controlled to perform the steering characteristic control efficiently.

Preferably, the steering characteristic control apparatus for a vehicle further comprises actual yaw rate detection means for detecting an actual yaw rate of the vehicle, theoretical yaw rate calculation means for calculating a theoretical yaw rate of the vehicle, and yaw rate deviation calculation means for subtracting the actual yaw rate detected by the actual yaw rate detection means from the theoretical yaw rate calculated by the theoretical yaw rate calculation means to calculate a yaw rate deviation, the low μ road control end criterion, high μ road control end criterion and non-steady turning control end criterion being set based on the value of the yaw rate deviation, the steering characteristic determination means determining the steering characteristic of the vehicle based on the yaw rate deviation. With the steering characteristic control apparatus for a vehicle, the steering characteristic of the vehicle can be determined readily with a high degree of accuracy under various conditions.

Further preferably, the steering characteristic control apparatus for a vehicle is configured such that, for each of the control end criteria including the control start criteria, low μ road control end criterion, high μ road control end criterion and non-steady turning control end criterion, a criterion for an understeer state where the yaw rate deviation is in the positive and another criterion for an oversteer state where the yaw rate deviation is in the negative, and the steering characteristic control means starts the oversteer suppression control when the yaw rate deviation comes to the oversteer side exceeding the control start criterion for the oversteer state and ends the oversteer suppression control when the yaw rate deviation comes to the neutral steer side into the control end criterion for the oversteer state, but starts the understeer suppression control when the yaw rate deviation comes to the understeer side exceeding the control start criterion for the oversteer state and ends the understeer suppression control when the yaw rate deviation comes to the neutral steer side into the control end criterion for the understeer state. With the steering characteristic control apparatus for a vehicle, the steering characteristic of the vehicle can be controlled appropriately.

In this instance, preferably the magnitude of a low μ road control end yaw rate deviation threshold value which corresponds to the low μ road control end criteria for the oversteer state and the understeer state is set smaller than the magnitude of a high μ road control end yaw rate deviation threshold value which corresponds to the high μ road control end criterion, and the magnitude of the non-steady turning control end yaw rate deviation threshold value which correspond to the non-steady turning control end criteria for the oversteer state and the understeer state is set greater than the magnitude of the low μ road control end yaw rate deviation threshold value but smaller than the magnitude of the high μ road control end yaw rate deviation threshold value. With the steering characteristic control apparatus for a vehicle, the low μ road control end criteria, high μ road control end criteria and non-steady turning control end criteria for the oversteer and the understeer can be set readily in the predetermined relationship.

Further preferably, the steering characteristic control apparatus for a vehicle is configured such that, where the non-steady turning control end criterion is set separately to the non-steady turning low μ road control end criterion and the non-steady turning high μ road control end criterion, the magnitude of the non-steady turning low μ road control end yaw rate deviation threshold value which corresponds to the non-steady turning low μ road control end criterion is set to a value lower than the magnitude of the non-steady turning high μ road control end yaw rate deviation threshold value which corresponds to the non-steady turning high μ road control end criterion. With the steering characteristic control apparatus for a vehicle, when the non-steady turning control end criteria are set separately from the low μ road control end criteria and the high μ road control end criteria, they can be set readily in the predetermined relationship.

Preferably, the steering characteristic control apparatus for a vehicle further comprises lateral acceleration detection means for detecting a lateral acceleration of the vehicle, the road surface μ estimation means determining that the road surface of the road on which the vehicle travels is a high μ road when a state wherein the lateral acceleration of the vehicle is higher than a high μ road determination threshold value continues for more than a determination time period set in advance under the conditions that the steering characteristic control is proceeding and that the vehicle is not being braked. With the steering characteristic control apparatus for a vehicle, the low surface μ can be determined readily with a high degree of accuracy.

Preferably, it is determined by the turning determination means that the turning of the vehicle is non-steady turning represented by a lane change when the vehicle during turning is steered in the opposite direction to the turning direction of the vehicle. With the steering characteristic control apparatus for a vehicle, the type of turning can be determined readily with a high degree of accuracy.

It is to be noted that preferably the turning determination means determines that the vehicle is turning when all of conditions that the magnitude of the steering angular speed of the vehicle is equal to or higher than a reference value, that the magnitude of the lateral acceleration generated on the vehicle is equal to or higher than a reference value and that the vehicle speed of the vehicle is equal to or higher than a predetermined speed are satisfied. Preferably, it is determined that the turning of the vehicle is non-steady turning represented by lane change turning when, while it remains determined that the vehicle is turning in this manner, the steering angular speed of the vehicle reaches a predetermined value or more in the opposite direction to the turning direction.

Preferably, the steering characteristic control means determines an end of the control under the condition that the control end criteria remain satisfied continuously for a predetermined period of time, and the predetermined period of time where the road surface upon steady turning is a low μ road is set longer than that where the road surface upon steady turning is a high μ road, but the predetermined period of time upon non-steady turning is set shorter than that where the road surface upon steady turning is a low μ road but set longer than that where the road surface upon steady turning is a high μ road. With the steering characteristic control apparatus for a vehicle, the control can be ended appropriately.

Preferably, the steering characteristic control means additionally uses control of suppressing the output power of an engine of the vehicle under a predetermined condition for the steering characteristic control. With the steering characteristic control apparatus for a vehicle, also when the steering characteristic deteriorates significantly or in a like case, enhancement of the steering characteristic can be performed rapidly.

According to another aspect of the present invention, there is provided a steering characteristic control method for a vehicle which includes a braking mechanism capable of braking left and right wheels of the vehicle separately from each other, and steering characteristic determination means for estimating a steering characteristic of the vehicle upon turning of the vehicle, wherein steering characteristic control of controlling the braking mechanism so as to apply braking force to one of the left and right wheels to adjust the steering characteristic to the neutral steering side is started when it is determined by the steering characteristic determination means that the steering characteristic of the vehicle exhibits an excessive oversteer or understeer state exceeding a control start criterion and then the steering characteristic control is ended when it is determined by the steering characteristic determination means during the steering characteristic control that the steering characteristic of the vehicle is stabilized within a control end criterion on the neutral steering side with respect to the control start criterion, comprising a road surface μ determination step of determining a road surface μ state of a road surface of the road on which the vehicle travels, a turning determination step of determining whether turning of the vehicle is steady turning or non-steady turning represented by a lane change, and an end determination step of determining, when it is determined at the turning determination step that the turning of the vehicle is the steady turning and it is estimated at the road surface μ estimation step that the road surface is a low μ road, an end of the steering characteristic control using a low μ road control end criterion as the control end criterion, determining, when it is determined at the turning determination step that the turning of the vehicle is the steady turning and it is estimated at the road surface μ estimation step that the road surface is a high μ road, an end of the steering characteristic control using a high μ road control end criterion as the control end criterion, and determining, when it is determined at the turning determination step that the turning of the vehicle is the non-steady turning, an end of the steering characteristic control using a non-steady turning control end criterion as the control end criterion, the low μ road control end criterion, high μ road control end criterion and non-steady turning control end criterion having values relating to the vehicle behavior stability, the low μ road control end criterion being set to a value higher in the vehicle behavior stability than that of the high μ road control end criterion, the non-steady turning control end criterion being set to a value lower in the vehicle behavior stability than that of the low μ road control end criterion but higher in the vehicle behavior stability than that of the high μ road control end criterion.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENTS

First Embodiment

Referring first to FIGS. 1 to 12, there is shown a steering characteristic control apparatus for a vehicle according to a first embodiment of the present invention.

Figure 2:
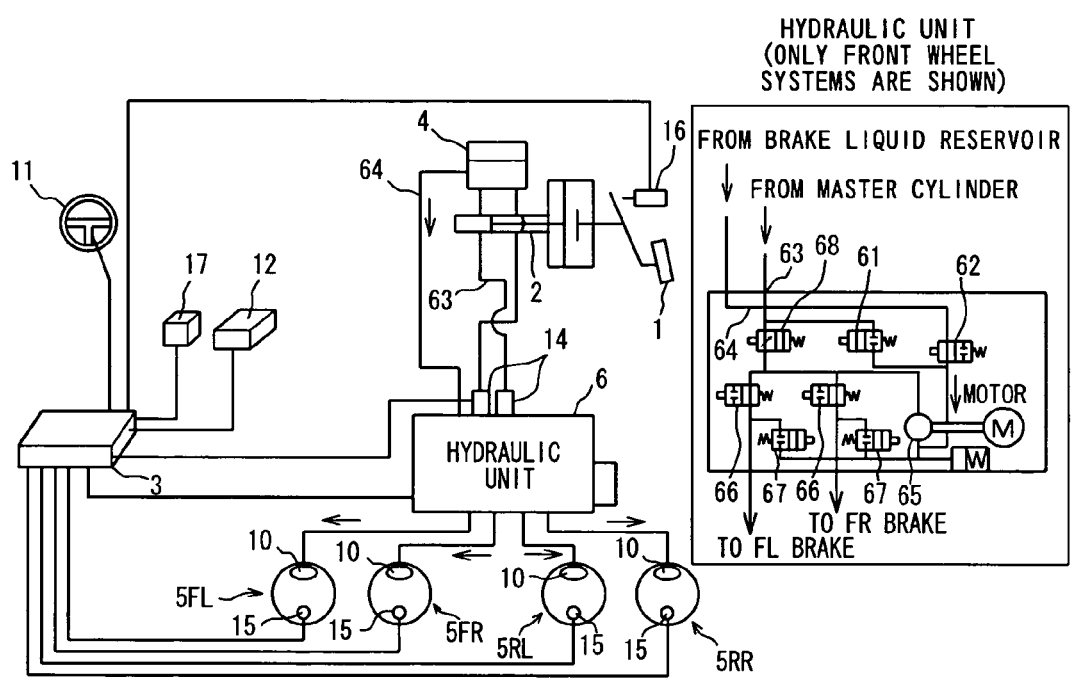
FIG. 2 is a system block diagram showing a general configuration of a braking system for a vehicle which includes the steering characteristic control apparatus for a vehicle according to the first embodiment.

The steering characteristic control apparatus for a vehicle according to the present embodiment is used with such a braking system for a vehicle as shown in FIG. 2. Referring to FIG. 2, the braking system for a vehicle includes a brake pedal 1, a master cylinder 2 which operates in an interlocking relationship with an operation of the brake pedal 1, and a hydraulic unit 6 for controlling the brake fluid pressure to be supplied from the master cylinder 2 or a brake fluid reservoir 4 to wheel cylinders of wheel brakes (hereinafter referred to simply as brakes) 10 for braking wheels (front left and right wheels and rear left and right wheels) 5FL, 5FR, 5RL, 5RR in response to the state of the master cylinder 2 or in accordance with an instruction from a braking controller (brake ECU) 3. It is to be noted here that a braking mechanism is formed from a hydraulic pressure adjusting system including the master cylinder 2, hydraulic unit 6 and so forth, the wheel brakes 10 for the braking wheels, and so forth.

In the present embodiment, as one of behavior control processes for stabilizing the behavior of the vehicle, braking control is performed in response to the magnitude of the yaw moment. Further, the steering characteristic control apparatus for a vehicle can perform integrated braking control of both of such braking control based on the magnitude of the yaw moment and braking control (driver control) based on the operation amount of the brake pedal 1.

As seen in FIG. 2 (in FIG. 2, only the left and right wheel brakes for the front wheels are shown), a differential pressure valve 68 in the hydraulic unit 6 operates in the steering characteristic control so that a predetermined pressure difference may appear between the upstream and the downstream of the differential pressure valve 68. When the vehicle is in the behavior control mode and the brake pedal 1 is not operated, an in-line intake valve 61 is closed while an out-line intake valve 62 is opened. Consequently, the brake fluid in the brake fluid reservoir 4 is introduced through an out-line 64 and the out-line intake valve 62 into a pump 65 and is pressurized by the pump 65, and the pressure of the brake liquid is adjusted by a fluid pressure holding valve 66 and a pressure reducing valve 67 and the brake fluid of the adjusted pressure is supplied to the brakes 10 for the wheels. On the other hand, when the vehicle is in the behavior control mode and the brake pedal 1 is operated, since the in-line intake valve 61 is opened and the out-line intake valve 62 is closed, the brake fluid in the master cylinder 2 is introduced through an in-line 63 and the in-line intake valve 61 into the pump 65 and is pressurized by the pump 65. Then, the pressure of the brake fluid is adjusted by the liquid pressure holding valve 66 and the pressure reducing valve 67, and the brake fluid of the adjusted pressure is supplied to the brakes 10 for the wheels.

It is to be noted that, if the braking control (driver control) by the driver is performed upon the behavior control of the vehicle described above, then the pressure adjustment by the fluid pressure holding valve 66 and the pressure reducing valve 67 is performed based on pressure information of the brake fluid in the master cylinder 2 detected by a fluid pressure sensor 14. Further, the in-line 63 and the out-line 64 join together on the downstream of the in-line intake valve 61 and the out-line intake valve 62, and the pump 65 is disposed on the downstream of the joining location. The liquid pressure holding valve 66 and the pressure reducing valve 67 are provided for each of the braking wheels 5FL, 5FR, 5RL, 5RR on the downstream of the pump 65.

Upon normal braking, the in-line intake valve 61 and the out-line intake valve 62 are closed, and the differential pressure valve 68 and the liquid pressure holding valve 66 are opened while the pressure reducing valve 67 is closed. Consequently, a brake fluid pressure corresponding to the pressure (that is, braking operation force) in the master cylinder 2 is supplied to the brake 10 for each of the wheels through the in-line 63, differential pressure valve 68 and liquid pressure holding valve 66. On the other hand, when an ABS (antilock brake system or antiskid brake system) operates, a brake fluid pressure corresponding to the braking operation force is suitably adjusted through the liquid pressure holding valve 66 and the pressure reducing valve 67 so that each wheel may not be locked.

The in-line intake valve 61, out-line intake valve 62, pump 65, and liquid pressure holding valves 66, pressure reducing valves 67 and differential pressure valve 68 for the braking wheels of the hydraulic unit 6 having such a configuration as described above are controlled by the brake ECU 3.

Various signals are inputted to the brake ECU 3. In particular, a steering wheel angle signal is inputted from a steering wheel angle sensor 11 provided for the steering wheel, and a yaw rate signal of the vehicle body is inputted from a yaw rate sensor (yaw rate detection means) 12 provided on the vehicle body. Further, a master cylinder fluid pressure signal is inputted from a master cylinder fluid pressure sensor 14, and a wheel speed signal is inputted from a wheel speed sensor 15 provided for each wheel. Furthermore, a brake pedal operation signal is inputted from a brake switch 16, and a forward-backward acceleration signal and a lateral acceleration signal are inputted from a forward-backward and lateral acceleration sensor (lateral acceleration detection means) 17 provided on the vehicle body.

Figure 1:
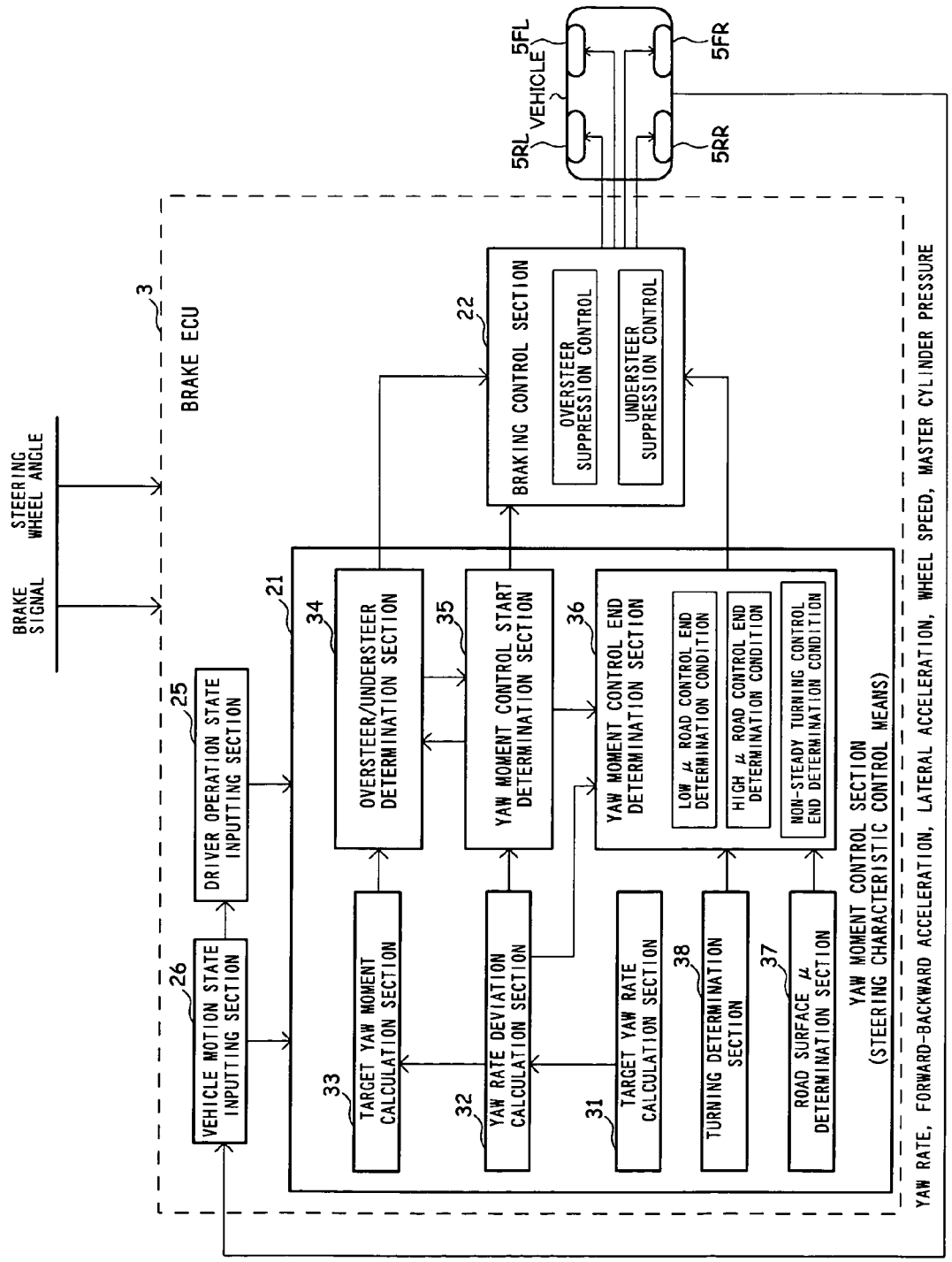
FIG. 1 is a control block diagram of a steering characteristic control apparatus for a vehicle according to a first embodiment of the present invention.

The brake ECU 3 includes such various functional elements as seen in FIG. 1. Referring to FIG. 1, the brake ECU 3 includes a driver operation state inputting section 25 for receiving various kinds of information relating to an operation state of the driver as inputs thereto and suitably processing and outputting the input information. The brake ECU 3 further includes a vehicle motion state inputting section 26 for receiving various kinds of information relating to an action condition (behavior) of the vehicle as inputs thereto and suitably processing and outputting the input information. The brake ECU 3 further includes a yaw moment control section (steering characteristic control means) 21 for performing braking control in response to the magnitude of the yaw moment in order to stabilize an instable behavior of the vehicle such as slipping of a wheel or spinning of the vehicle. The brake ECU 3 further includes a braking control section 22 for executing braking control based on a braking control amount set by the yaw moment control section 21. It is to be that the brake ECU 3 includes an automatic slowdown control section, a roll-over suppressing control section (both not shown) and so forth as additional control sections for stabilizing the behavior of the vehicle. However, description of such additional control sections is omitted herein.

The driver operation state inputting section 25 determines whether or not the brake pedal 1 is operated or pedaled by the driver, and sets on/off of a brake switch flag $F_{bsw}$ and further calculates the operation amount $PR_{DR}$ of the brake pedal 1 based on master cylinder fluid pressure information inputted thereto from the master cylinder fluid pressure sensor 14. A result of the determination and a result of the calculation by the driver operation state inputting section 25 are outputted to the yaw moment control section 21.

It is to be noted that the brake switch flag $F_{bsw}$ set by the driver operation state inputting section 25 is set to on ($F_{bsw}$=1) when the brake pedal 1 is operated by the driver but is set to off ($F_{bsw}$=0) when the brake pedal 1 is not operated.

The vehicle motion state inputting section 26 recognizes an actual yaw rate $Y_r$ generated on the vehicle body from a yaw rate signal inputted from the yaw rate sensor 12, an actual lateral acceleration $G_y$ generated on the vehicle body from a lateral acceleration signal inputted from the forward-backward and lateral acceleration sensor 17 and a steering wheel angle $\theta_h$ inputted from steering wheel angle information inputted from the steering wheel sensor 11, and outputs them to the yaw moment control section 21. Further, the vehicle motion state inputting section 26 here calculates a vehicle body speed $V_b$, a steering wheel angular speed $\omega_h$ and an actual steering angle $\delta$. Although the vehicle body speed $V_b$ is normally calculated based on wheel speed signals from the wheel speed sensors 15, if a slip occurs with a wheel, then the vehicle motion state inputting section 26 adds a time integrated value of the forward-backward acceleration obtained from the forward-backward and lateral acceleration sensor 17 to the vehicle body speed based on the wheel speed signal till then to calculate the vehicle body speed (in this instance, the calculated vehicle body speed is an estimated vehicle body speed). It is to be noted that, while the steering wheel angle $\theta_h$ represents an angle of the steering wheel steered by the driver with respect to a neutral position, the actual steering angle $\delta$ represents an angle of a steered wheel.

The yaw moment control section 21 includes a target yaw rate calculation section (theoretical yaw rate calculation means) 31 for calculating a yaw rate to be used as a target (target yaw rate as a theoretical yaw rate) in order for the vehicle to travel stably using a linear two-wheel model as a norm, a yaw rate deviation calculation section 32 for calculating the deviation between a yaw rate appearing actually on the vehicle and the target yaw rate, a target yaw moment calculation section 33 for calculating a yaw moment necessary for turning round and restoration for stabilizing the vehicle, an oversteer/understeer determination section (steering characteristic determination means) 34 for determining one of an oversteer state and an understeer state from the sign of the target yaw moment, a yaw moment control start determination section 35 for determining a start of braking control in accordance with the magnitude of the yaw moment (such braking control is hereinafter referred to simply as yaw moment control), a yaw moment control end determination section 36 for determining an end of the yaw moment control, a road surface μ determination section 37 for determining a friction state (road surface μ) of the road surface of a road on which the vehicle travels, and a turning determination section 38 for determining whether turning of the vehicle is steady turning or non-steady turning represented by lane change turning.

The yaw moment control section 21 determines whether or not the vehicle is in a state wherein the yaw moment control is required and then performs the braking control. If it is determined that the yaw moment control is required, then the yaw moment control section 21 sets a magnitude of braking force to be applied to a wheel and the braking control section 22 performs the braking control based on the setting.

Figure 5:
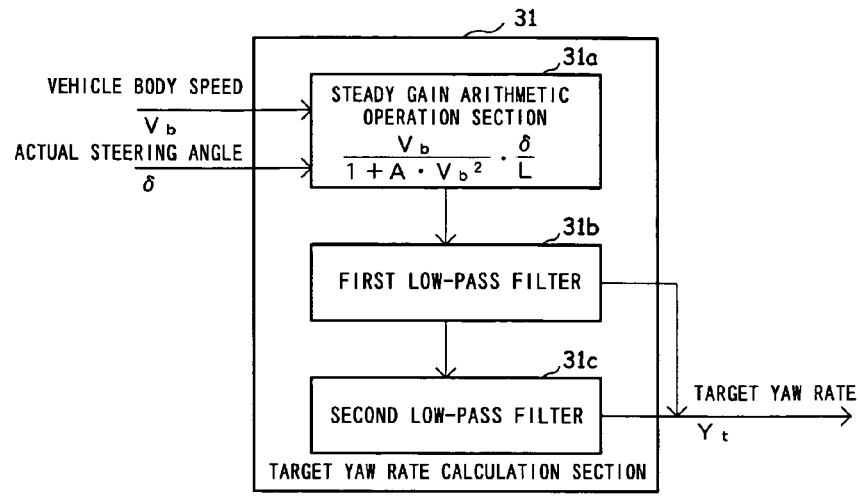
FIG. 5 is a control block diagram of a target yaw rate calculation section of the steering characteristic control apparatus for a vehicle of the first embodiment.

Now, a configuration of each of the functional elements which form the yaw moment control section 21 is described. The target yaw rate calculation section 31 calculates a target yaw rate $Y_t$ to be used as a target in order for the vehicle to travel stably. Referring to FIG. 5, the target yaw rate calculation section 31 includes a steady gain arithmetic operation section 31a, a first low-pass filter 31b, and a second low-pass filter 31c.

The steady gain arithmetic operation section 31a receives the vehicle body speed $V_b$ and the actual steering angle $\delta$ calculated by the vehicle motion state inputting section 26 as inputs thereto and determines the target yaw rate $Y_t$ from the parameters just mentioned and a stability factor A using a linear two-wheel model as a norm.

The target yaw rate $Y_t$ determined by the steady gain arithmetic operation section 31a undergoes a filter process by the first low-pass filter 31b and outputted as the target yaw rate $Y_t$ when the yaw moment control is being carried out by the yaw moment control section 21 (that is, when a yaw moment control carrying out determination flag $F_{ymc}$ is $F_{ymc}=1$: this flag is hereinafter described). On the other hand, when the yaw moment control is not being carried out (that is, when the yaw moment control carrying out determination flag $F_{ymc}$ is $F_{ymc}=0$), the target yaw rate $Y_t$ undergoes a filter process twice by the first low-pass filter 31b and the second low-pass filter 31c.

In particular, when the yaw moment control is being carried out, the target yaw rate calculation section 31 calculates the target yaw rate $Y_t$ (in this instance, $Y_{t1}$) in accordance with the following expression (1):

$$Y_{t1} = LPF1 \cdot \left( \frac{V_b}{1 + A \cdot V_b^2} \cdot \frac{\delta}{L} \right) \quad (1)$$

where $V_b$ is the speed of the vehicle body, A the stability factor, $\delta$ the actual steering angle, L the wheel base, and LPF1 the filter characteristic value of the first low-pass filter.

On the other hand, when the yaw moment control is not being carried out, the target yaw rate $Y_t$ (in this instance, $Y_{t2}$) is calculated in accordance with the following expression (2):

$$Y_{t2} = LPF2 \cdot LPF1 \cdot \left( \frac{V_b}{1 + A \cdot V_b^2} \cdot \frac{\delta}{L} \right) \quad (2)$$

where LPF2 is the filter characteristic value of the second low-pass filter.

In this manner, while the target yaw rate calculation section 31 performs a filter process using a low-pass filter in this manner to suppress wrong setting of the target yaw rate arising from error data, when the yaw moment control is not being carried out, in order to calculate a stable target yaw rate having higher reliability, noise is removed from a result of the arithmetic operation of the steady gain arithmetic operation section 31a by means of the first low-pass filter 31b and the second low-pass filter 31c. On the other hand, when the yaw moment control is being carried out, in order to calculate a target yaw rate having a good dynamic response to steering, the number of times of filter processing is decreased such that noise is removed only by means of the first low-pass filter 31b.

Figure 6:
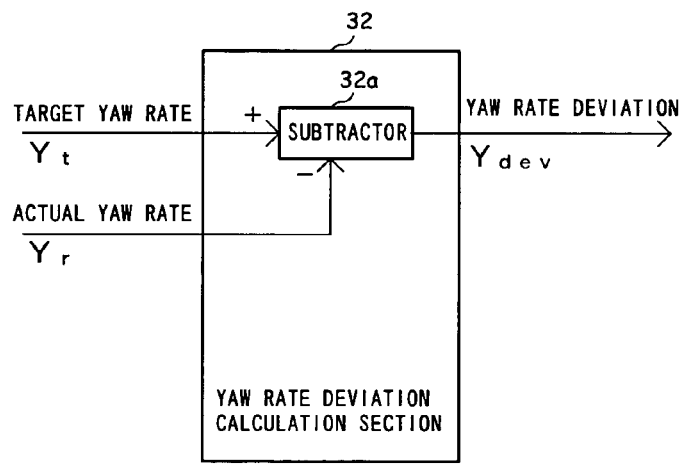
FIG. 6 is a control block diagram of a yaw rate deviation calculation section of the steering characteristic control apparatus for a vehicle according to the first embodiment.

The yaw rate deviation calculation section 32 calculates the deviation between the target yaw rate $Y_t$ (that is, one of $Y_{t1}$ and $Y_{t2}$) calculated by the target yaw rate calculation section 31 and the actual yaw rate $Y_r$ inputted from the vehicle motion state inputting section 26, that is, a yaw rate deviation $Y_{dev}$. As seen in FIG. 6, the yaw rate deviation calculation section 32 includes a subtractor 32a and here calculates the yaw rate deviation $Y_{dev}$ in accordance with the following expression (3):

$$Y_{dev} = Y_t - Y_r \quad (3)$$

where $Y_{dev}$ is the yaw rate deviation, $Y_t$ the target yaw rate, and $Y_r$ the actual yaw rate.

It is to be noted that, in order that the yaw rate deviation $Y_{dev}$ arithmetically operated here may be represented in a sign unified such that a value thereof on the understeer side (turning round control side) has the positive sign and a value thereof on the oversteer side (restoration control side) has the negative side irrespective of the turning direction of the vehicle, the value thereof is maintained as it is for right turning but is reversed in sign for left turning, and the yaw rate deviation $Y_{dev}$ of the sign determined in this manner is used for later control determination. The yaw rate deviation $Y_{dev}$ arithmetically operated here is outputted not only to the yaw moment control start determination section 35 and the yaw moment control end determination section 36 but also to the target yaw moment calculation section 33.

Figure 7:
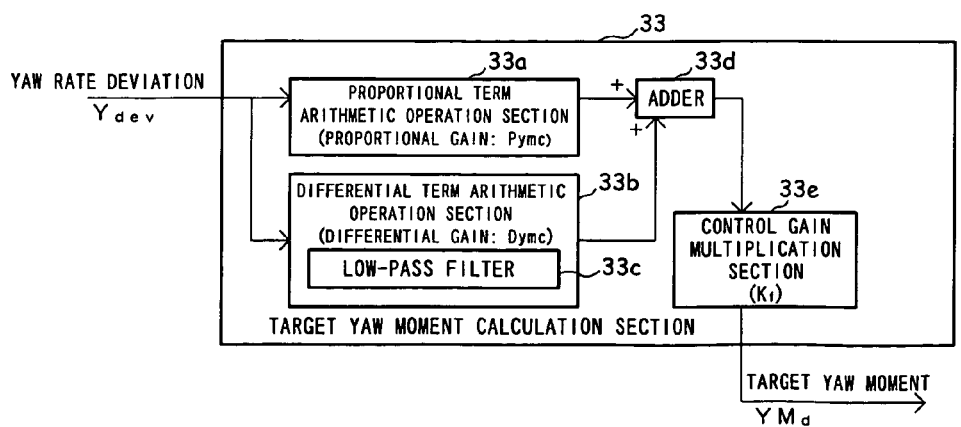
FIG. 7 is a control block diagram of a target yaw moment calculation section of the steering characteristic control apparatus for a vehicle according to the first embodiment.

The target yaw moment calculation section 33 calculates a target yaw moment $YM_d$ based on the yaw rate deviation $Y_{dev}$ calculated by the yaw rate deviation calculation section 32. Referring to FIG. 7, the target yaw moment calculation section 33 includes a proportional term arithmetic operation section 33a, a differential term arithmetic operation section 33b, an adder 33d, and a control gain multiplication section 33e.

The proportional term arithmetic operation section 33a multiplies the yaw rate deviation $Y_{dev}$ inputted thereto by a proportional gain $P_{ymc}$. The differential term arithmetic operation section 33b differentiates the yaw rate deviation $Y_{dev}$ inputted thereto with respect to time, filters a result of the differentiation by means of a low-pass filter 33c provided therein and then multiplies the filtered differentiation result by a differential gain $D_{ymc}$. Then, resulting values by the arithmetic operations of the proportional term arithmetic operation section 33a and the differential term arithmetic operation section 33b are added by the adder 33d, and the sum is multiplied by a control gain $K_f$ by the control gain multiplication section 33e. Then, the product is outputted as a target yaw moment $YM_d$ from the target yaw moment calculation section 33. The target yaw moment $YM_d$ determined by the target yaw moment calculation section 33 is outputted to the oversteer/understeer determination section 34, yaw moment control start determination section 35 and yaw moment control end determination section 36.

The oversteer/understeer determination section 34 determines based on the sign of the target yaw moment $YM_d$ value inputted thereto from the target yaw moment calculation section 33 whether the steering characteristic of the vehicle is in an oversteer tendency or in an understeer tendency. In particular, if the target yaw moment $YM_d$ is in the positive, then the oversteer/understeer determination section 34 determines that the steering characteristic of the vehicle is in an understeer tendency, but if the target yaw moment $YM_d$ is in the negative, the oversteer/understeer determination section 34 determines that the steering characteristic of the vehicle is in an oversteer tendency. The oversteer or understeer state determined by the oversteer/understeer determination section 34 is outputted not only to the yaw moment control start determination section 35 but also to the braking control section 22.

The yaw moment control start determination section 35 determines whether or not the yaw moment control for controlling the yaw moment generated on the vehicle should be started. This determination is made depending upon whether or not a predetermined start condition is satisfied. If the predetermined start condition is satisfied, then the yaw moment control carrying out determination flag $F_{ymc}$ is set to $F_{ymc}=1$ (on), and braking control of the yaw moment control is carried out by the braking control section 22.

The start condition of the yaw moment control (that is, yaw moment control start condition) is that all of conditions (1) that the vehicle body speed $V_b$ is equal to or higher than a reference value (low speed value set in advance) $V_1$ and (2) that, when the vehicle is in an oversteer state, the yaw rate deviation $Y_{dev}$ is equal to or lower than a value (negative value) obtained by multiplying a reference value (a reference yaw rate as a threshold value set in advance, and an oversteer suppression control start threshold value) $Y_{ost}$ by a correction gain K or, when the vehicle is in an understeer state, the yaw rate deviation $Y_{dev}$ is equal to or higher than a value obtained by multiplying a reference value (a reference yaw rate as a threshold value set in advance, and an understeer suppression control start threshold value) $Y_{ust}$. If both of the conditions are satisfied, then the yaw moment control is started.

It is to be noted that, when the yaw moment control is started, if the condition for an oversteer state in the condition (2) above is satisfied, then the yaw moment control as oversteer suppression control is carried out, but if the condition for an understeer state in the condition (2) is satisfied, then the yaw moment control as understeer suppression control is carried out. Further, it is determined depending upon the condition (2) whether or not the steering characteristic of the vehicle is in an excessive oversteer or understeer state, that is, whether or not the steering characteristic is in a neutral steer state.

Figure 4A:
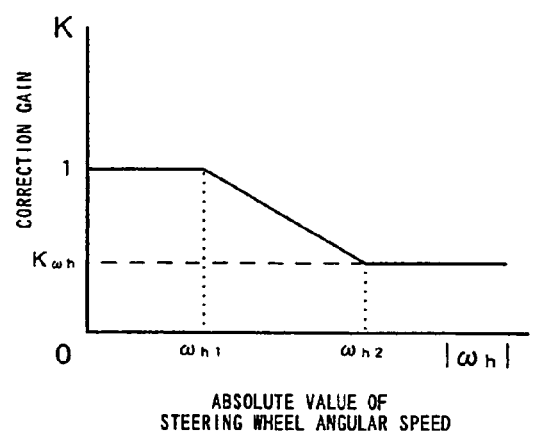
FIGS. 4(a) to 4(c) are characteristic diagrams illustrating yaw moment correction characteristics in an over steer state, an understeer state and another understeer state of the vehicle, respectively, when a start of steering characteristic control by the steering characteristic control apparatus for a vehicle according to the first embodiment is determined.
Figure 4B:
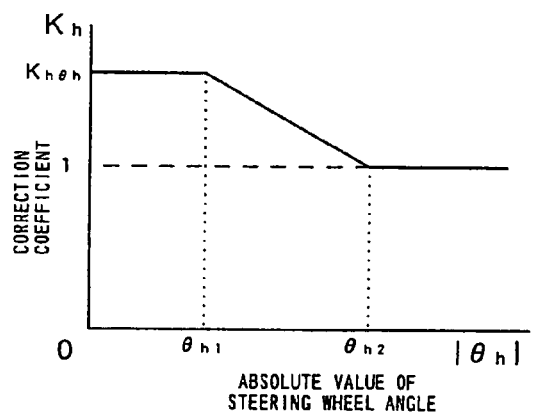
Figure 4C:
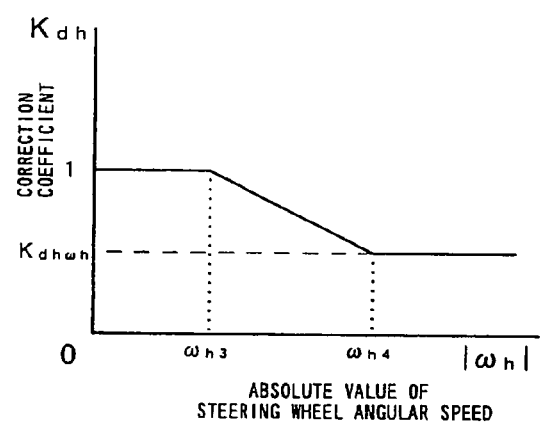

The correction gain K is set in response to the steering wheel angular speed $\omega_h$ and the steering wheel angle $\theta_h$ as seen from FIGS. 4(a) to 4(c). The correction gain K has a value set differently depending upon the steering characteristic of the vehicle.

Where the steering characteristic of the vehicle is understeer, the correction gain K is set in response to an absolute value of the steering wheel angular speed $\omega_h$ based on the coordination map illustrated in FIG. 4(a). In particular, where the absolute value of the steering wheel angular speed $\omega_h$ is lower than a predetermined value $\omega_{h1}$, the correction gain K is set to K=1. Where the absolute value of the steering wheel angular speed $\omega_h$ is equal to or higher than the predetermined value $\omega_{h1}$ but lower than another predetermined value $\omega_{h2}$ (where $\omega_{h1} < \omega_{h2}$), the correction gain K is set so as to decrease as the absolute value of the steering wheel angular speed $\omega_h$ increases. Further, where the absolute value of the steering wheel angular speed $\omega_h$ is equal to or higher than the predetermined value $\omega_{h2}$, the correction gain K is set to a fixed value $K_{\omega h}$.

On the other hand, where the steering characteristic of the vehicle is oversteer, the product of a correction coefficient set in response to the steering wheel angle and another correction coefficient set in response to the steering wheel angular speed based on the coordination maps shown in FIGS. 4(b) and 4(c), respectively, is set as the correction gain K (expression (4)).

$$K = K_h \cdot K_{dh} \quad (4)$$

where K is the correction gain and $K_h$ and $K_{dh}$ are the correction coefficients.

The correction coefficient $K_h$ is set in such a manner as seen in FIG. 4(b). In particular, the correction coefficient $K_h$ is set to a fixed value $K_h \theta_h$ where the absolute value of the steering wheel angle $\theta_h$ is lower than a predetermined value $\theta_{h1}$. Where the absolute value of the steering wheel angle $\theta_h$ is equal to or higher than the predetermined value $\theta_{h1}$ but lower than another predetermined value $\theta_{h2}$ (where $\theta_{h1} < \theta_{h2}$), the correction coefficient $K_h$ is set so as to decrease as the steering wheel angle increases. However, where the steering wheel angle $\theta_h$ is equal to or higher than the predetermined value $\theta_{h2}$, the correction coefficient $K_h$ is set to $K_h = 1$.

Meanwhile, the correction coefficient $K_{dh}$ is set in such a manner as seen in FIG. 4(c). In particular, the correction coefficient $K_{dh}$ is set to $K_{dh} = 1$ where the absolute value of the steering wheel angular speed $\omega_h$ is lower than a predetermined value $\omega_{h3}$. Where the absolute value of the steering wheel angular speed $\omega_h$ is equal to or higher than the predetermined value $\omega_{h3}$ but lower than another predetermined value $\omega_{h4}$ (where $\omega_{h3} < \omega_{h4}$), the correction coefficient $K_{dh}$ is set so as to decrease as the steering wheel angle increases. However, where the steering wheel angular speed $\omega_h$ is equal to or higher than the predetermined value $\omega_{h4}$, the correction coefficient $K_{dh}$ is set to a fixed value $K_{dh} \omega_h$.

The road surface μ determination section 37 determines the road surface μ (coefficient of friction between a wheel and the road surface) of the road surface of a road on which the vehicle travels. This determination is made based on determination of whether or not a predetermined high μ determination start condition or a high μ determination end condition is satisfied. If the high μ determination start condition is satisfied, then a high μ determination flag $F_{hm}$ is set to $F_{hm} = 1$ (on) and outputted to the yaw moment control end determination section 36. After the high μ determination is started once, the determination result is maintained until the high μ road determination end condition is satisfied.

The high μ road determination start condition is that all of conditions (1) that the yaw moment control is operative ($F_{ymc} = 1$), (2) that a brake switch flag $F_{bsw}$ is $F_{bsw} = 0$ (that the brake pedal 1 is not operated by the driver), and that (3) the lateral acceleration $G_y$ continues to be equal to or higher than a predetermined value $G_{yhantei}$ (high μ road determination threshold value) for predetermined time predetermined time $T_{yhantei}$ or more are satisfied. If all of the conditions are satisfied, then it is determined that the road surface of the road on which the vehicle travels is a high μ road (that is, control for the high μ road is required).

It is to be noted that the conditions specified above allow the road surface μ determination section 37 to make a determination of the road surface μ only while the vehicle is in a behavior in which there is no possibility of making a wrong determination, and a high μ road can be determined with certainty.

Meanwhile, the high μ road determination end condition is that any of conditions (1) that the yaw moment control is inoperative ($F_{ymc} = 1$) and that (2) the brake switch flag $F_{bsw}$ is $F_{bsw} = 1$ (that the brake pedal 1 is operated by the driver) is satisfied. If one of the conditions is satisfied, then it is determined that the road surface of the road on which the vehicle travels is not a high μ road (that is, the control for a high μ road is not required).

The turning determination section 38 determines whether or not the vehicle is turning. Further, if the vehicle is turning, then the turning determination section 38 determines whether the turning is steady turning (hereinafter referred to also as simple turning) such as turning along a moderate S-shaped curve beginning with turning along a loop bridge or the like along which turning in the same direction continues or non-steady (transient) turning (non-steady turning represented by lane change turning) such as turning upon a lane change or turning emergency avoiding steering upon which the turning direction is changed over suddenly.

The turning determination section 38 determines that the vehicle is turning when all of a condition that the magnitude $|\omega_h|$ of the steering wheel angular speed (steering angular speed) $\omega_h$ of the vehicle is equal to or higher than a reference value $\omega_{h0}$ ($|\omega_h| \geq \omega_{h0}$), another condition that the magnitude $|G_y|$ of the lateral acceleration $G_y$ generated on the vehicle is equal to or higher than a reference value $G_{y0}$ and a further condition that the vehicle body speed $V_b$ of the vehicle is equal to or higher than a predetermined speed $V_{b0}$ are satisfied. If it is determined that the vehicle is turning, then the turning determination section 38 sets a turning determination flag $F_{senkai}$ to 1. If, while it remains determined that the vehicle is turning ($F_{senkai}=1$) in this manner, the steering wheel angular speed (steering angular speed) $\omega_h$ of the vehicle changes to the opposite direction to the turning direction and the magnitude $|\omega_h|$ of the steering wheel angular speed (steering angular speed) $\omega_h$ becomes equal to or higher than the turning state determination reference value $\omega_{h1}$ ($|\omega_h| \geq \omega_{h1}$), then the turning determination section 38 determines that the turning of the vehicle is non-steady turning represented by lane change turning. If it is determined that the vehicle is in non-steady turning, the turning determination section 38 sets a turning determination flag $F_{lc}$ to 1. On the other hand, even if the vehicle is turning ($F_{senkai}=1$), when the steering wheel angular speed (steering angular speed) $\omega_h$ does not change to the opposite direction to the turning direction or when, even if the steering wheel angular speed changes to the opposite direction, the magnitude $|\omega_h|$ of the steering wheel angular speed (steering angular speed) $\omega_h$ does not become equal to or higher than the turning state criterion value $\omega_{h1}$ ($|\omega_h| \geq \omega_{h1}$), the turning determination section 38 determines that the turning of the vehicle is steady turning (not non-steady turning). If it is determined that the vehicle is in steady turning, the turning determination section 38 sets the turning determination flag $F_{1c}$ to 0. This determination is maintained until after the turning determination flag $F_{senkai}$ changes to 0.

The yaw moment control end determination section 36 determines whether or not the yaw moment control should be ended contrary to the determination of the yaw moment control start determination section 35. This determination is made depending upon whether or not a predetermined end condition is satisfied. If the predetermined end condition is satisfied, then the yaw moment control carrying out determination flag $F_{ymc}$ is set to $F_{ymc}=0$ (off), and the braking control section 22 ends the braking control of the yaw moment control.

The predetermined end condition is set based on the type of turning (whether the turning is steady turning or non-steady turning) determined by the turning determination section 38 and the high μ determination flag $F_{hm}$ inputted from the road surface μ determination section 37.

In particular, if it is determined by the turning determination section 38 that the turning is steady turning, then the predetermined end condition is selected from between the low μ road control end determination condition and the high μ road control end determination condition. In particular, upon steady turning (simple turning), the behavior of the vehicle is liable to be influenced by the situation (road surface μ) of the traveling road of the vehicle, and preferably, on a high μ road, the control end condition is set to such a low road condition that the behavior stability is enhanced a little so that the behavior control may be ended at a point of time when the behavior of the vehicle is stabilized a little, but on a low μ road, the control end condition is set to a condition with which the behavior stability is sufficiently high so that the behavior control is ended at a point of time when the behavior of the vehicle is stabilized sufficiently.

Thus, by selecting the end condition for the yaw moment control in response to the situation (road surface μ) of the traveling road surface of the vehicle, control which does not provide excessive braking can be achieved while the behavior stability of the vehicle is secured. In particular, when the vehicle is traveling on a high μ road on which the behavior thereof is likely to be stabilized early, the end condition for the yaw moment control is set more moderate than that when the vehicle travels on a general road surface (the control end criterion is set to such a degree that the behavior stability of the vehicle is enhanced a little) so that the behavior control is ended rather early without waiting that the behavior of the vehicle is stabilized sufficiently by the control thereby to prevent unnecessary slowdown of the vehicle and reduce the unfamiliar feeling of the driver arising from the slowdown. On the contrary, when the vehicle is running on a low μ road on which the behavior of the vehicle is not stabilized readily, the end condition for the yaw moment control is set severer (the control end criterion is set to such a degree that the behavior stability of the vehicle is enhanced sufficiently) so that the behavior control is performed sufficiently thereby to restore the behavior stability of the vehicle with certainty.

First, the end condition (that is, the high μ road control end determination condition) where it is determined that the traveling road surface of the vehicle is a high μ road (where the high μ determination flag $F_{hm}$ is $F_{hm}=1$) is that one of conditions (1) that the vehicle body speed $V_b$ is equal to or lower than a reference value (low speed value set in advance) $V_2$ (where $V_2<V_1$) and (2) that the yaw rate deviation $Y_{dev}$ continues to be lower than a reference value (high μ road control end criterion) $Y_{ehm}$ for predetermined time (high μ road determination time) $T_{ehm}$ or more. If one of the conditions is satisfied, then the yaw moment control is ended.

On the other hand, the end condition (that is, the low μ road control end determination condition) where it is determined that the traveling road surface of the vehicle is not a high μ road (where the high μ determination flag $F_{hm}$ is $F_{hm}=0$) is that one of conditions (1) that the vehicle body speed $V_b$ is lower than the reference value (low speed value set in advance) $V_2$ and (2) that the yaw rate deviation $Y_{dev}$ continues to be lower than a reference value (low μ road control end criterion) $Y_e$ for predetermined time (low μ road determination time) $T_e$ or more. If one of the conditions is satisfied, then the yaw moment control is ended.

It is to be noted that the low μ road control end reference value $Y_e$ is set lower than the high μ road control end reference value $Y_{ehm}$ ($Y_e<Y_{ehm}$), and the low μ road determination time $T_e$ is set longer than the high μ road determination time $T_{ehm}$ ($T_{ehm}<T_e$). This is because it is intended to set the control end criterion for traveling on a low μ road severer to restore the behavior stability of the vehicle with certainty and it is intended to set the control end criterion for traveling on a high μ road less severe to end the behavior control rather early thereby to prevent unnecessary slowdown of the vehicle as described hereinabove.

The high μ road control end condition and the low μ road control end condition are same except the condition (2) described hereinabove. In other words, one of the condition (2) for a low μ road and the condition (2) for a high μ road is selected in response to the determination of whether the surface μ is high or low.

By the selection of a condition, when it is determined that the traveling road surface of the vehicle is a high μ road, it is considered that the coefficient of friction between the road surface and the wheels is high and the vehicle is likely to be placed into a stabilized state rapidly, and the reference value for the yaw rate deviation $Y_{dev}$ is set to a higher value and the duration is set to a shorter period of time thereby to make the end condition for the yaw moment control moderate, that is, to allow the yaw moment control to be ended rapidly.

On the other hand, if it is determined by the turning determination section 38 that the turning is non-steady turning, then an end of the control is determined based on a non-steady turning control end determination condition (that the non-steady turning control end criterion is satisfied) set to an intermediate level between the low μ road control end determination condition (that the low μ road control end criterion is satisfied) and the high μ road control end determination condition (that the high μ road control end criterion is satisfied) for steady turning.

In particular, upon non-steady turning such as lane change turning, the behavior of the vehicle is less liable to be influenced by the situation of the traveling road surface (road surface μ) of the vehicle than steady turning (simple turning), and changeover of the steering angle is performed rapidly and also turning round of the vehicle is performed suddenly. Consequently, even if the road surface is a high μ road, a parameter value representative of the behavior stability is liable to be displaced to the instable side where as, since straight forward traveling is restored quickly after a steering operation, the behavior of the vehicle is liable to be stabilized even on a low μ road.

Therefore, for non-steady turning such as turning upon a lane change, the non-steady turning control end criterion is set so as to provide a lower behavior stability of the vehicle than the low μ road control end criterion but provide a higher behavior stability of the vehicle than the high μ road control end criterion, and an end of the control is determined under the condition that the non-steady turning control end criterion is satisfied (non-steady turning control end determination condition).

More particularly, if it is determined by the turning determination section 38 that the turning is non-steady turning, then the predetermined end condition described hereinabove is that one of conditions (1) that the vehicle body speed $V_b$ is lower than the reference value (low speed value set in advance) $V_2$ (where $V_2<V_1$) and (2) that the yaw rate deviation $Y_{dev}$ continues to be lower than a reference value (non-steady turning control end criterion) $Y_{elc}$ for predetermined time (non-steady turning determination time) $T_{elc}$ or more is satisfied. If one of the conditions is satisfied, then the yaw moment control is ended.

The non-steady turning control end reference value $Y_{elc}$ is set lower than the high μ road control end reference value $Y_{ehm}$ for steady turning but higher than the low μ road control end reference value $Y_e$ for steady turning ($Y_e<Y_{elc}<Y_{ehm}$). Further, the non-steady turning determination time $T_{elc}$ is set shorter than the low μ road determination time $T_e$ but longer than the high μ road determination time $T_{ehm}$ ($T_{ehm}<T_{elc}<T_e$).

Consequently, upon non-steady turning, determination of an end of the control can be performed appropriately.

The braking control section 22 performs substantial braking control of the yaw moment control, that is, controls the braking force of the wheel brake 10 for each braking wheel 5 based on results of determination by the oversteer/understeer determination section 34, yaw moment control start determination section 35 and yaw moment control end determination section 36.

In the yaw moment control by the braking control section 22, braking force is applied to different wheels in response to the steering characteristic of the vehicle. First, when the steering characteristic of the vehicle is oversteer, braking force is applied to wheels on the turning outer wheel side. On the other hand, where the steering characteristic of the wheel is understeer, braking force is applied to wheels on the turning inner wheel side. It is to be noted that, in the present embodiment, in an oversteer state, braking force is applied to the front wheel on the turning outer wheel side, and where braking force is applied to the rear wheel on the turning inner wheel side, the braking force is reduced. On the other hand, in an understeer state, braking force is applied to the rear wheel on the turning inner wheel side.

The magnitude of the control amount to be applied to a wheel in the yaw moment control is calculated as a brake fluid pressure gradient (increasing/decreasing pressure gradient) $PR_{ymc}$ in accordance with the following expression (5) based on the target yaw moment $YM_d$ calculated by the target yaw moment calculation section 33:

$$PR_{ymc} = \frac{YM_d}{B_f \cdot T_f} \quad (5)$$

where $B_f$ is the tread of the vehicle, and $T_f$ a braking force coefficient.

It is to be noted that not the braking force itself (absolute magnitude of the braking force) but a braking force increasing/decreasing value is set as the control amount. This is because the present control is performed in a predetermined cycle and it is set by what amount the braking force should be increased or decreased with respect to braking force in the preceding control cycle. Further, the braking force here is set as an increasing/decreasing pressure gradient (controlling increasing/decreasing pressure amount) $PR_{ymc}$ in place of the brake liquid pressure.

Since the steering characteristic control apparatus for a vehicle according to the first embodiment of the present invention is configured in such a manner as described above, it carries out control, for example, in such a manner as illustrated in FIGS. 8 to 11.

Figure 8:
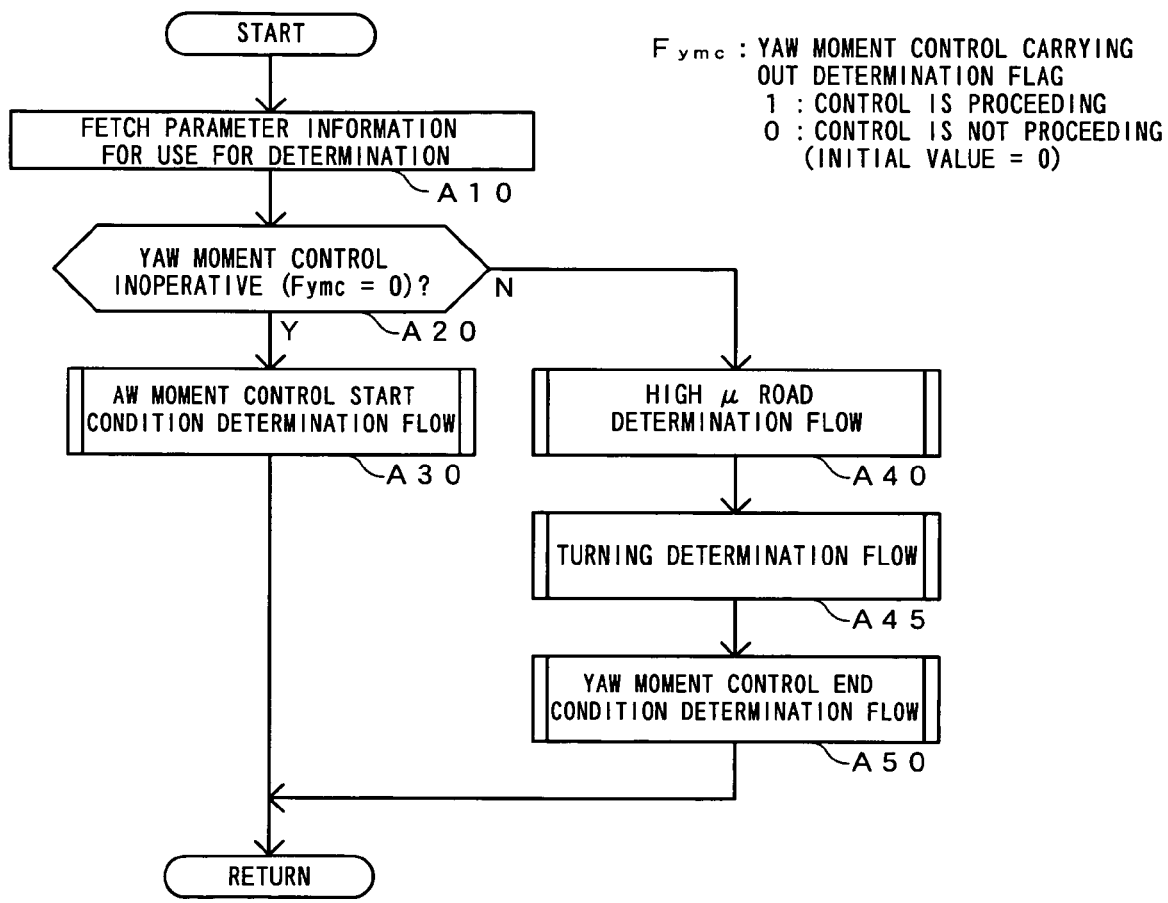
FIG. 8 is a main control flow chart illustrating a main control procedure of steering characteristic control by the steering characteristic control apparatus for a vehicle according to the first embodiment.

In the present steering characteristic control apparatus for a vehicle, the yaw moment control is generally executed in accordance with a main flow illustrated in FIG. 8.

Referring to FIG. 8, parameters necessary to perform a start determination of the yaw moment control are inputted at step A10. More particularly, the vehicle body speed $V_b$, steering wheel angle $\theta_h$, steering wheel angular speed $\omega_h$ and lateral acceleration $G_y$ are inputted from the vehicle motion state inputting section 26, and the brake switch flag $F_{bsw}$ information and determination information of presence/absence of a sudden braking operation by the driver are inputted from the driver operation state inputting section 25. Further, the yaw rate deviation $Y_{dev}$ calculated by the yaw rate deviation calculation section 32 and the target yaw moment $YM_d$ calculated by the target yaw moment calculation section 33 are inputted.

Then at step A20, it is determined whether or not the yaw moment control is proceeding. This determination is made based on on/off of the yaw moment control carrying out determination flag $F_{ymc}$. If $F_{ymc}=0$, then since the yaw moment control is not proceeding as yet, the processing advances to step A30, at which a yaw moment control start condition determination process is executed. On the other hand, if $F_{ymc}=1$, then since the yaw moment control is proceeding already, the processing advances to step A40, at which a high μ road determination flow is executed. Thereafter, the processing advances to step A45, at which a turning determination flow is executed, and further to step A50, at which a yaw moment control end condition determination flow is executed.

The processes at steps A30, A40, A45 and A50 are executed in accordance with such control flows as illustrated as sub routines to the present main routine in FIGS. 9, 10, 11 and 12, respectively.

Figure 9:
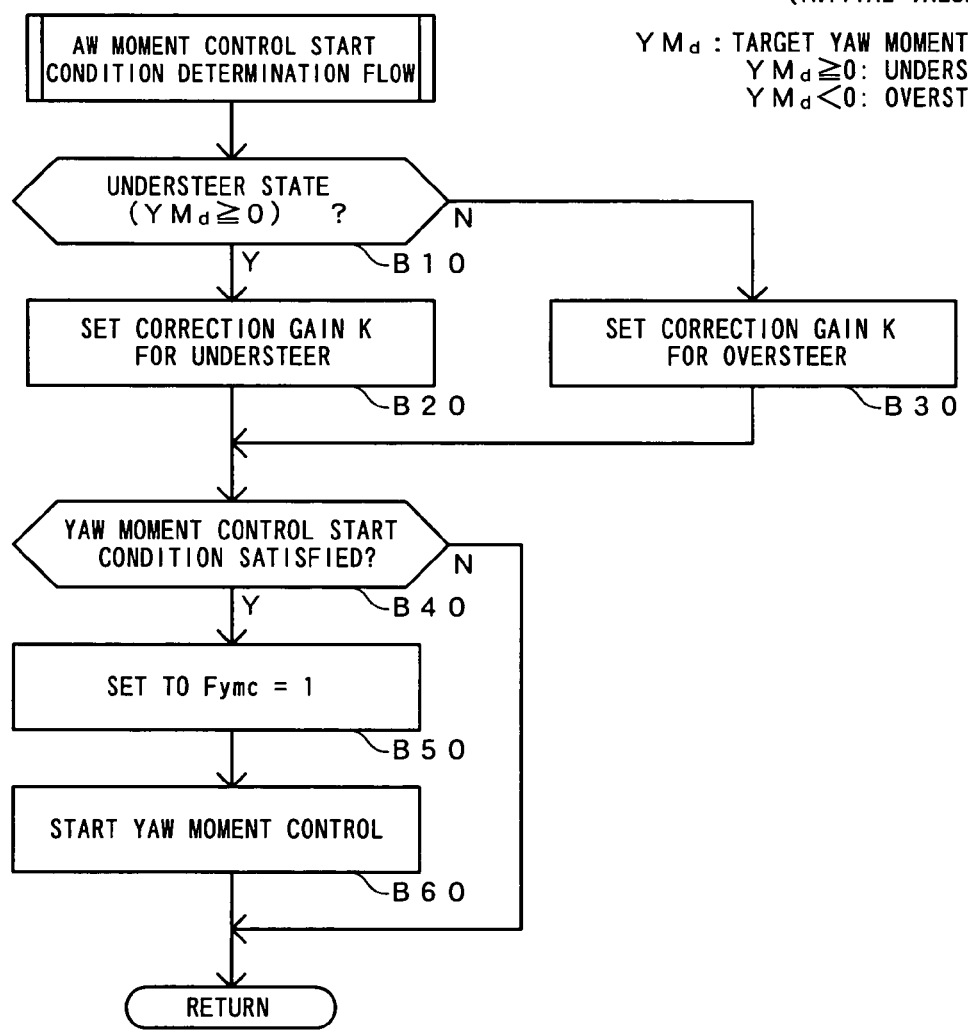
FIG. 9 is a control flow chart illustrating a procedure for determining a start condition of the steering characteristic control by the steering characteristic control apparatus for a vehicle according to the first embodiment.

FIG. 9 illustrates the yaw moment control start condition determination flow in accordance with which the yaw moment control start determination section 35 determines whether or not the yaw moment control should be started.

Referring to FIG. 9, first at step B10, it is determined whether or not the steering characteristic of the vehicle is understeer or oversteer. The determination is made based on the positive or negative sign of the target yaw moment $YM_d$ value calculated by the target yaw moment calculation section 33. Here, if $YM_d \geq 0$, then it is determined that the steering characteristic of the vehicle is understeer, and the processing advances to step B20, at which the correction gain K for the understeer is set in accordance with the coordination map illustrated in FIG. 4(a), whereafter the processing advances to step B40. On the other hand, if $YM_d<0$ at step B10, then it is determined that the steering characteristic of the vehicle is oversteer, and the processing advances to step B30, at which the correction gain K for the oversteer is set from the product of the correction coefficients $K_h$ and $K_{dh}$ determined in accordance with the coordination maps illustrated in FIGS. 4(b) and 4(c), respectively, whereafter the processing advances to step B40.

Then at step B40, it is determined whether or not the yaw moment control should be started, that is, whether or not the yaw moment control start condition is satisfied. If the yaw moment control start condition is satisfied at step B40, then the processing advances to step B50, at which the yaw moment control carrying out determination flag $F_{ymc}$ is set to $F_{ymc}=1$ (on), whereafter the processing advances to step B60, at which the yaw moment control is started. On the other hand, if the yaw moment control start condition is not satisfied at step B40, then the flow is ended immediately without starting the yaw moment control.

It is to be noted that, in the determination of the yaw moment control start condition at step B40, when the steering characteristic of the vehicle is oversteer, it is determined whether or not the yaw rate deviation $Y_{dev}$ calculated by the yaw rate deviation calculation section 32 is equal to or lower than a value obtained by multiplying the reference yaw rate $Y_{ost}$ by the correction gain K set at step B20, but when the steering characteristic of the vehicle is understeer, it is determined whether or not the yaw rate deviation $Y_{dev}$ is equal to or higher than a value obtained by multiplying the reference yaw rate $Y_{ust}$ by the correction gain K set at step B30.

In particular, the degree of oversteer or understeer of the vehicle is determined here based on the yaw rate deviation $Y_{dev}$, and if the degree thus determined is excessive ($Y_{dev}<K \cdot Y_{ost}$ or $Y_{dev}>K \cdot Y_{ust}$), then the yaw moment control is started. Then, when the steering characteristic of the vehicle is oversteer, oversteer suppression control is set, but when the steering characteristic of the vehicle is understeer, understeer suppression control is set. On the other hand, if the degree of oversteer or understeer of the vehicle is not excessive ($K \cdot Y_{ost} \leq Y_{dev} \leq K \cdot Y_{ust}$), the yaw moment control start condition is not satisfied and the yaw moment control is not started.

Figure 10:
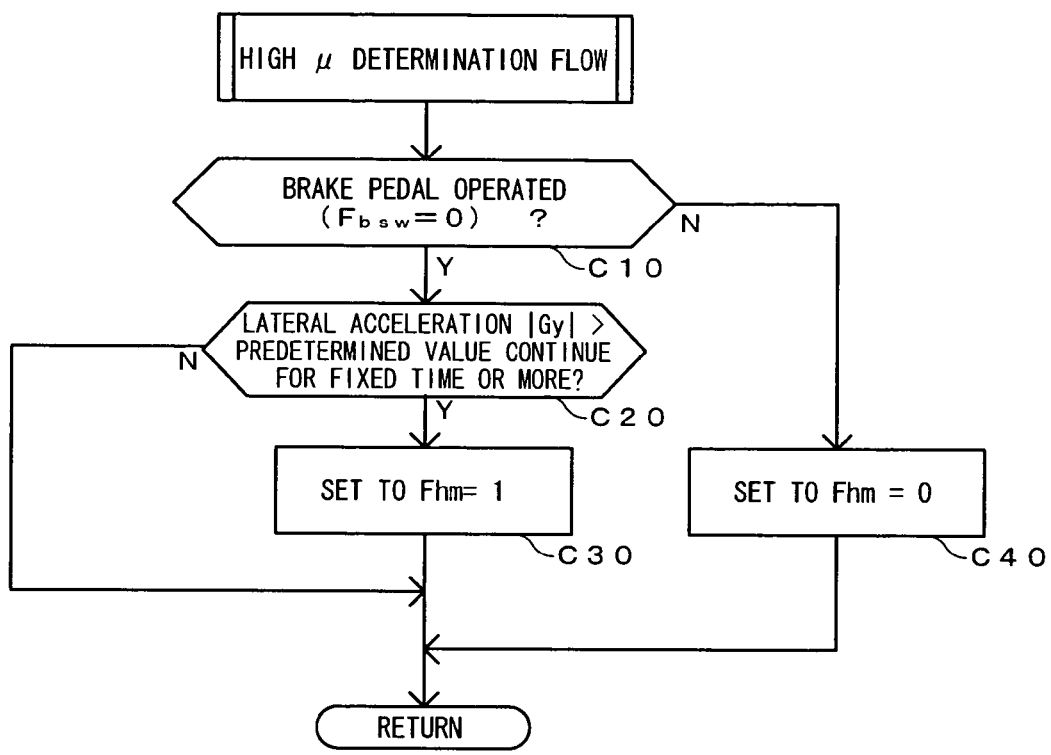
FIG. 10 is a control flow chart illustrating a procedure for determining a road surface μ state of a traveling road surface by the steering characteristic control apparatus for a vehicle according to the first embodiment.

The high μ road determination process at step A40 of FIG. 8 is executed by the road surface μ determination section 37 to determine whether or not the road surface on which the vehicle travels is a high μ road as seen in FIG. 10.

Referring to FIG. 10, first at step C10, it is determined whether or not the brake pedal 1 is operated by the driver, that is, whether or not the brake switch flag $F_{bsw}$ is $F_{bsw}=0$. If $F_{bsw}=0$, then the processing advances to step C20, but if $F_{bsw}=1$, then the processing advances to step C40, at which the high μ road determination flag $F_{hm}$ is set to $F_{hm}=0$, whereafter the processing of the present flow is ended.

At step C20, it is determined whether or not the magnitude $|G_y|$ of the lateral acceleration $G_y$ inputted from the vehicle motion state inputting section 26 remains equal to or higher than the predetermined value $G_{yhantei}$ for the predetermined time $T_{yhantei}$ or more. If this condition is satisfied, then it is determined that the road surface on which the vehicle travels is a high μ road, and the processing advances to step C30, at which the high μ determination flag $F_{hm}$ is set to $F_{hm}=1$, whereafter the processing of the present flow is ended.

On the other hand, if the condition is not satisfied at step C20, then the processing is ended immediately without updating the high μ road determination flag $F_{hm}$.

According to such control of the present flow as described above, the present apparatus carries out the yaw moment control corresponding to a high μ road. Thus, the control of the present flow indicates that, when the yaw moment control is not being carried out or when a braking operation by the driver is being carried out, substantially the high μ road determination is not performed and that both of the fact that the yaw moment control is not being carried out and a braking operation by the driver construct an end condition for the high μ road determination.

Figure 11:
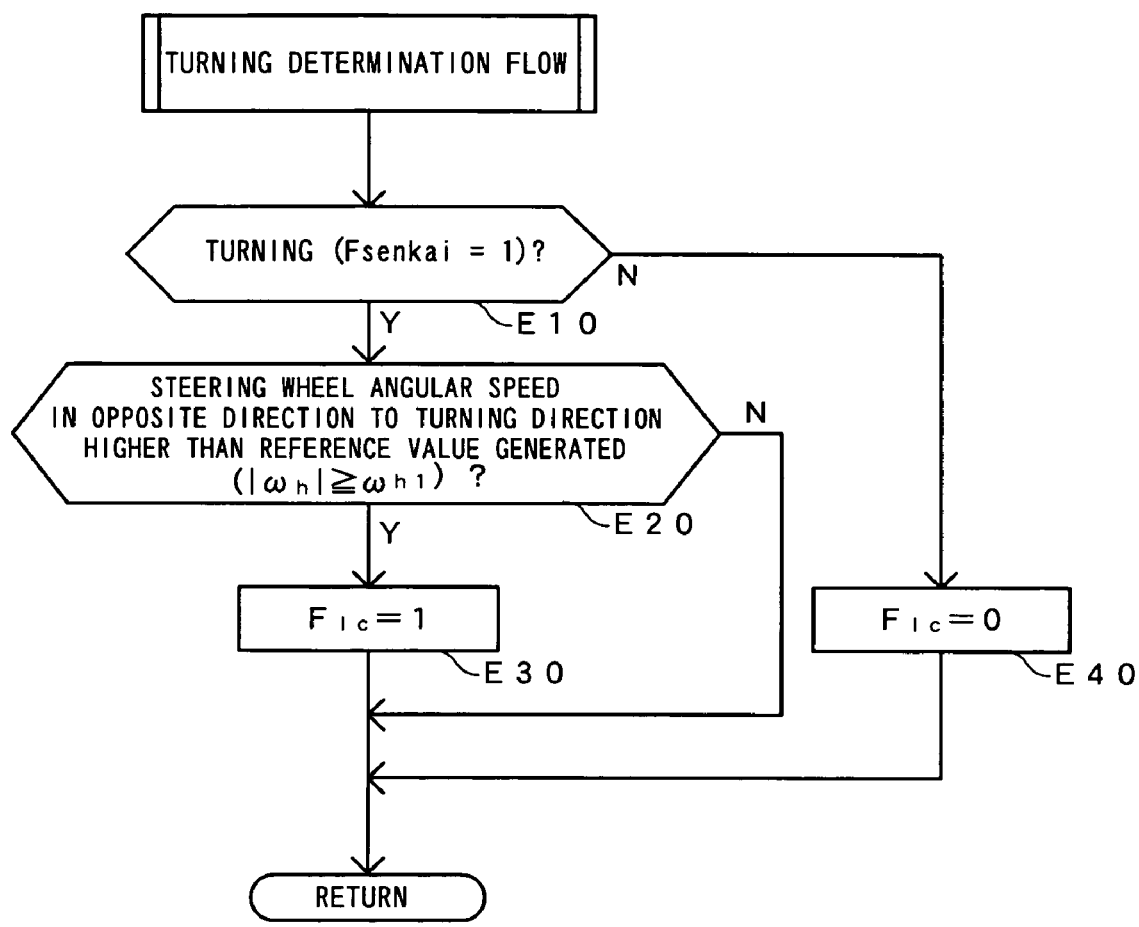
FIG. 11 is a control flow chart illustrating a procedure for determining a type of turning by the steering characteristic control apparatus for a vehicle according to the first embodiment.

The turning determination process at step A45 of FIG. 8 is executed by the turning determination section 38 to determine whether the type of turning of the vehicle is steady turning or non-steady turning as seen from FIG. 11.

Referring to FIG. 11, first at step E10, it is determined whether or not the vehicle is turning (turning determination flag $F_{senkai}=1$). It is to be noted here that, although it is usually determined that the vehicle is turning (turning determination flag $F_{senkai}=1$), in the present turning determination, if all of the conditions that the magnitude $|\omega_h|$ of the steering wheel angular speed (steering angular speed) $\omega_h$ of the vehicle is equal to or higher than the reference value $\omega_{h0}$ ($|\omega_h| \geq \omega_{h0}$), that the magnitude $|G_y|$ of the lateral acceleration $G_y$ generated on the vehicle is equal to or higher than the reference value $G_{y0}$ and that the vehicle body speed $V_b$ of the vehicle is equal to or higher than the predetermined speed $V_{b0}$ are satisfied, then it is determined that the vehicle is turning ($F_{senkai}=1$).

Then, during the turning of the vehicle, it is determined at step E20 whether or not the steering wheel angular speed (steering angular speed) $\omega_h$ of the vehicle changes to the opposite direction to the turning direction until the magnitude $|\omega_h|$ becomes equal to or higher than the turning state determination reference value $\omega_{h1}$ ($|\omega_{h1}| \geq \omega_{h1}$). If the magnitude $|\omega_h|$ of the steering wheel angular speed is equal to or higher than the turning state determination reference value $\omega_{h1}$ then it is determined that the turning of the vehicle is non-steady turning such as turning upon a lane change, and the turning determination flag $F_{1c}$ is set to 1 (step E30). This determination is maintained until after the turning determination flag $F_{senkai}$ changes to 0. In other words, even if the vehicle is turning ($F_{senkai}=1$), when the steering wheel angular speed $\omega_h$ of the vehicle does not change to the opposite direction to the turning direction or when, even if the steering wheel angular speed $\omega_h$ changes to the opposite direction to the turning direction, the magnitude $|\omega_h|$ of the steering wheel angular speed $\omega_h$ does not reach the turning state determination reference value $\omega_{h1}$, it is determined that the turning of the vehicle is steady turning and the turning determination flag $F_{1c}$ is set to 0 (step E40), whereupon the determination result (turning determination flag $F_{1c}$=1) which has been maintained till then is cleared.

Figure 12:
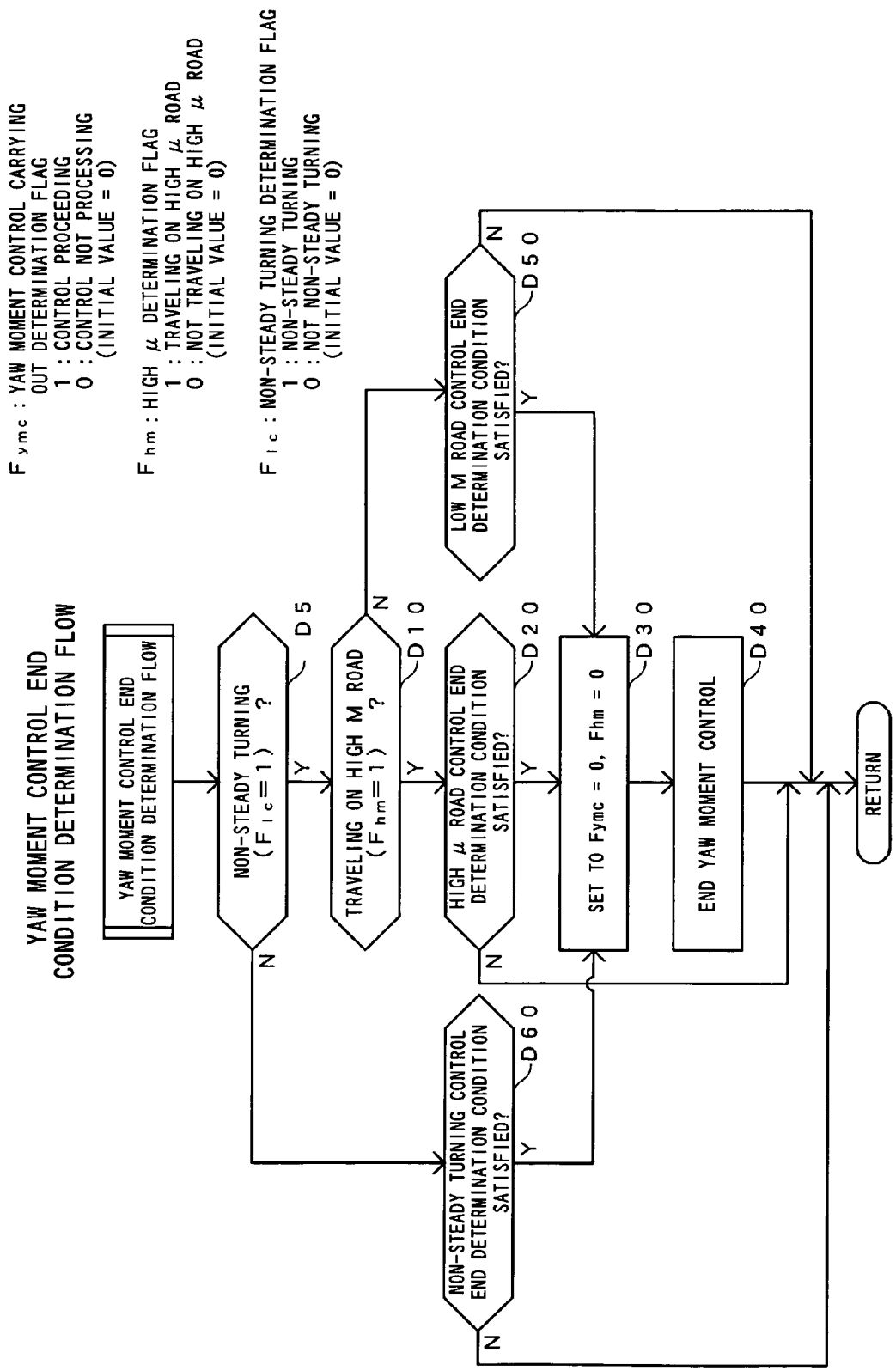
FIG. 12 is a control flow chart illustrating a procedure for determining an end condition of the steering characteristic control by the steering characteristic control apparatus for a vehicle according to the first embodiment.

The yaw moment control end condition determination process at step A50 of FIG. 8 is executed by the yaw moment control end determination section 36 to determine whether or not the yaw moment control should be ended as seen in FIG. 12.

Referring to FIG. 12, first at step D5, it is determined based on the non-steady turning determination flag $F_{1c}$ whether or not the turning of the vehicle is non-steady turning. If the turning of the vehicle is non-steady turning, then the processing advances to step D60, but if the turning of the vehicle is not non-steady turning (that is, if the turning of the vehicle is steady turning), then the processing advances to step D10.

At step D10, it is determined based on the high μ road determination flag $F_{hm}$ whether or not the road surface on which the vehicle is traveling is a high μ road. IF $F_{hm}$=1, then since the traveling road surface is a high μ road, the processing advances to step D20, at which the high μ road control end determination condition is selected as the control end determination condition of the yaw moment control and it is determined whether or not the selected condition is satisfied. On the other hand, where $F_{hm}$=0, since the traveling road surface is not a high μ road, the processing advances to step D50, at which the low μ road control end determination condition is selected as the control end determination condition of the yaw moment control and it is determined whether or not the selected condition is satisfied.

If the high μ road control end determination condition is satisfied at step D20, then the processing advances to step D30, at which the yaw moment control carrying out determination flag $F_{ymc}$ is set to $F_{ymc}$=0 and the high μ road determination flag $F_{hm}$ is set to $F_{hm}$=0. Thereafter, the processing advances to step D40, at which the yaw moment control is ended, and the processing of the flow is ended therewith. On the other hand, if the high μ road control end determination condition is not satisfied at step D20, then the processing of the flow is ended without ending the yaw moment control.

Similarly, if the low μ road control end determination condition is satisfied at step D50, then the yaw moment control carrying out determination flag $F_{ymc}$ is set to $F_{ymc}$=0 and the high μ determination flag $F_{hm}$ is set to $F_{hm}$=0 at step D30. Thereafter, the processing advances to step D40, at which the yaw moment control is ended, and the processing of the flow is ended therewith. On the other hand, if the condition is not satisfied at step D50, then the processing of the flow is ended without ending the yaw moment control.

If it is determined at step D5 that the turning of the vehicle is non-steady turning, then the processing advances to step D60, at which the non-steady turning control end determination condition is selected as the control end determination condition of the yaw moment control and it is determined whether or not the selected condition is satisfied.

Figure 3A:
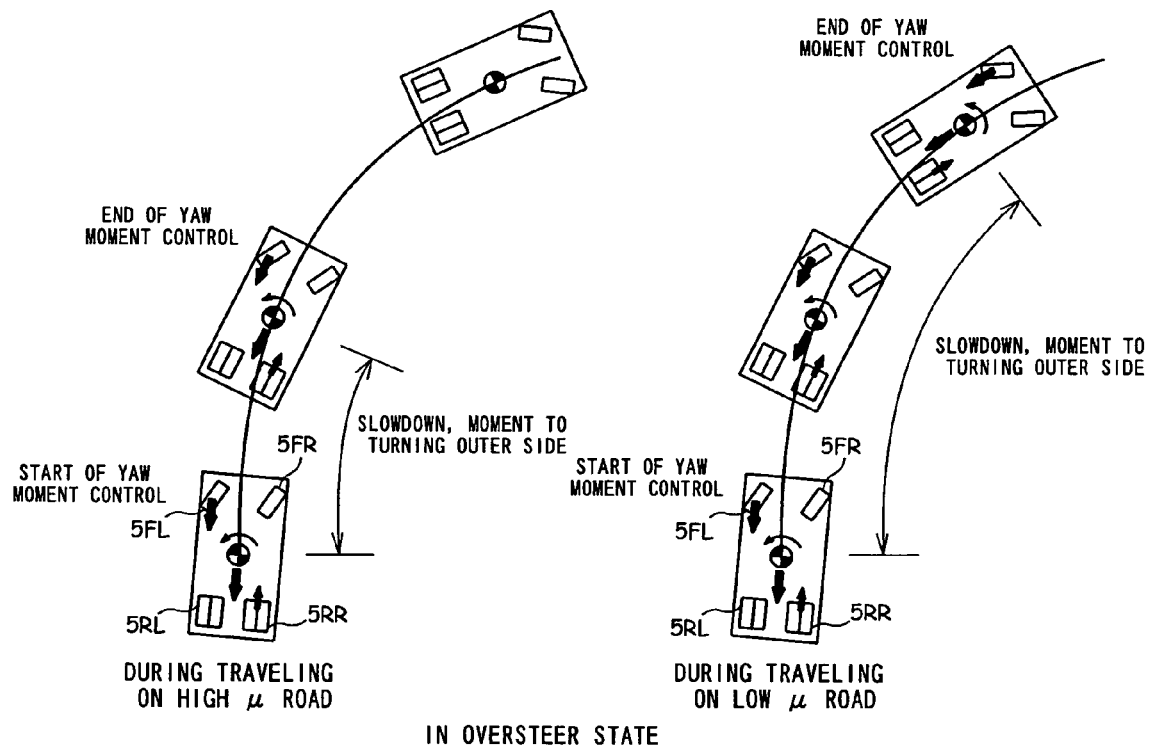
FIGS. 3(a) and 3(b) are schematic views illustrating braking control manners in an oversteer state and an understeer state of the vehicle, respectively, in accordance with a steering characteristic and a road surface μ where the vehicle includes the steering characteristic control apparatus for a vehicle according to the first embodiment.
Figure 3B:
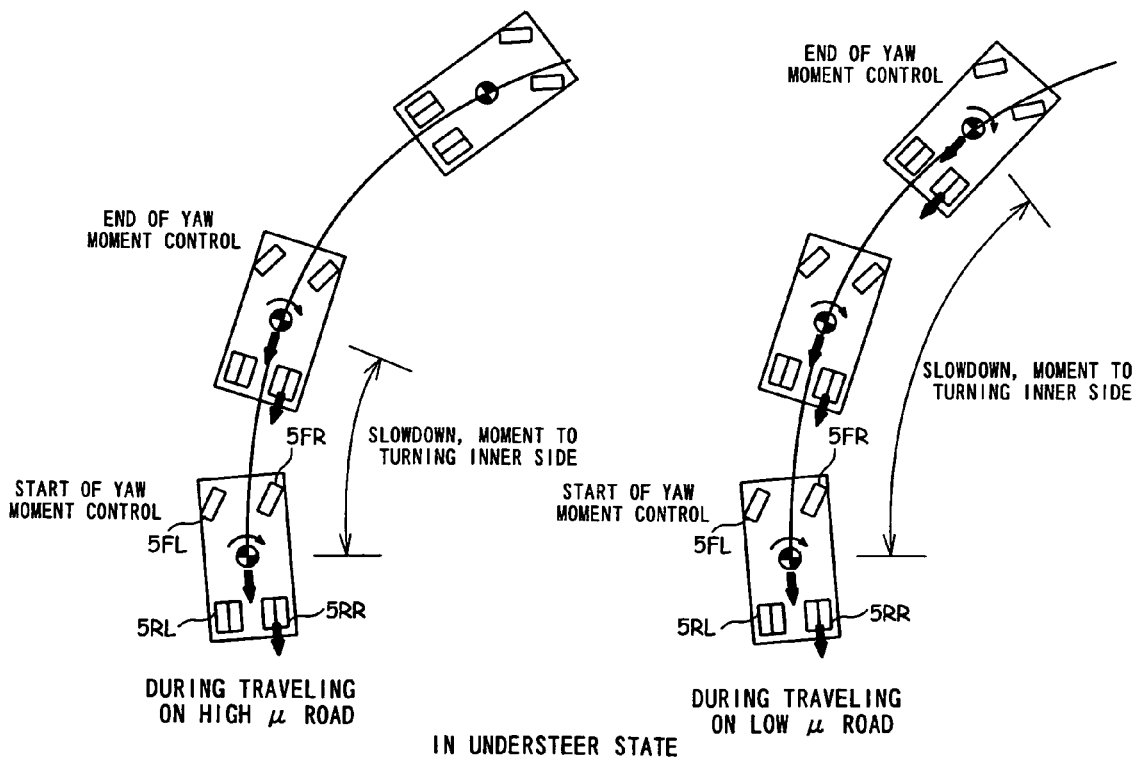

If the non-steady turning control end determination condition is satisfied at step D60, then the yaw moment control carrying out determination flag $F_{ymc}$ is set to $F_{ymc}$=0 and the high μ determination flag $F_{hm}$ is set to $F_{hm}$=0 at step D30, whereafter the processing advances to step D40, at which the yaw moment control is ended, and the processing of the flow is ended therewith. On the other hand, if the condition is not satisfied at step D60, then the processing of the flow is ended without ending the yaw moment control.

Where the steering characteristic of the vehicle is controlled in such a manner as described above, the vehicle indicates such a behavior as seen in FIG. 3(*a*) or 3(*b*).

First, a target yaw rate $Y_t$ is calculated based on the vehicle body speed $V_b$ and the actual steering angle δ by the target yaw rate calculation section 31, and a yaw rate deviation $Y_{dev}$ is calculated based on the target yaw rate $Y_t$ and the actual yaw rate $Y_r$ by the yaw rate deviation calculation section 32. By calculating a deviation between a theoretical yaw rate (target yaw rate $Y_t$) for performing stabilized turning and an actual yaw rate (actual yaw rate $Y_r$) in this manner, a yaw rate necessary to stabilize the vehicle (that is, an insufficient or excessive yaw rate) can be grasped precisely.

Then, a target yaw moment $YM_d$ is calculated based on the yaw rate deviation $Y_{dev}$ by the target yaw moment calculation section 33. If the target yaw moment $YM_d$ is $YM_d \geq 0$, then it is determined that the steering characteristic of the vehicle is in an understeer tendency, but if $YM_d < 0$, then it is determined that the steering characteristic of the vehicle is in an oversteer tendency.

When the start condition of the yaw moment control is satisfied as a result of turning of the vehicle, if the steering characteristic of the vehicle is oversteer, then braking force is applied to the front wheel 5FL of the turning outer wheel as seen in FIG. 3(*a*), and if the braking force is acting on the rear wheel 5RR of the turning inner wheel, then the braking force is controlled so as to decrease. When the steering characteristic of the vehicle is oversteer during turning to the right, a yaw moment to the left turning direction (that is, restoration direction) can be applied to the vehicle effectively by the braking force to the turning outer wheel.

Further, since the magnitude of the control amount applied by the present control is calculated as a brake liquid pressure gradient based on the target yaw moment $YM_d$ calculated by the target yaw moment calculation section 33, a yaw moment corresponding to the target yaw moment $YM_d$ acts upon the vehicle by the braking control described above. Accordingly, the vehicle can travel along the target locus, and stable turning can be achieved.

During the yaw moment control, it is determined by the road surface μ determination section 37 whether the traveling road surface of the vehicle is a high μ road or a low μ road, and it is determined by the turning determination section 38 whether the type of the turning of the vehicle is steady turning or non-steady turning.

Particularly since the determination of the road surface μ is performed such that, while the yaw moment control is proceeding and a braking operation is not being performed by the driver, only when the magnitude $|G_y|$ of the lateral acceleration $G_y$ of the vehicle continues to be equal to or higher than the predetermined value $G_{yhantei}$ for predetermined time $T_{hantei}$ or more, it is determined that the traveling road surface of the vehicle is a high μ road, wrong determination of the road surface μ can be prevented and a high μ road can be determined with certainty.

If it is determined that the traveling road surface of the vehicle is a low μ road when the turning of the vehicle is steady turning, then the low μ road control end determination condition is selected, but if it is determined that the traveling road surface of the vehicle is a high μ road, then the high μ road control end determination condition which is more moderate than the low μ road control end determination condition is selected and an end determination of the yaw moment control is made based on the selected condition. Therefore, when the vehicle is traveling on a high μ road, the yaw moment control can be ended earlier than that when the vehicle is traveling on a low μ road, and unnecessary slowdown can be prevented.

In short, on whichever one of a high μ road and a low μ road the vehicle is traveling, the vehicle can turn along the target locus. However, when the vehicle runs on a high μ road, unnecessary slowdown is prevented and the traveling performance of the vehicle is secured, and the feeling of the driver can be enhanced. On the other hand, when the vehicle runs on a low μ road, the control can be continued with certainty until the behavior of the vehicle is stabilized, and stable turning can be performed.

On the other hand, when the steering characteristic of the vehicle is understeer, the braking force control is performed such that braking force is applied to the rear wheel 5RR of the turning inner wheel. When the steering characteristic of the vehicle is understeer during turning to the right, a yaw moment can be applied to the right turning direction (that is, in the turning round direction) effectively to the vehicle by the braking force to the turning inner wheel. Further, by the braking control, a moment corresponding to the target yaw moment $YM_d$ acts upon the vehicle, and the vehicle can travel along the target locus and can turn stably.

On the other hand, if it is determined that the traveling road surface of the vehicle is a high μ road, then the yaw moment control can be ended earlier than that upon traveling on a low μ road thereby to prevent unnecessary slowdown and enhance the feeling of the driver. On the other hand, if it is determined that the traveling road surface of the vehicle is a low μ road, then stabilized turning can be achieved.

Further, since the end condition of the yaw moment control described above is determined based on the yaw rate deviation of the vehicle and the duration of the yaw rate deviation, a steering characteristic of the vehicle such as oversteer or understeer can be grasped precisely, and turning round control or restoration control can be executed readily.

Meanwhile, when the turning of the vehicle is non-steady turning such as turning for a lane change, an end of the control is determined based on the control end condition for non-steady turning which is on the stable side of the vehicle behavior with respect to the control end condition for traveling on a high μ road but is not on the stable side of the vehicle behavior so much as the control end condition upon traveling on a low μ road irrespective of the road surface μ. Consequently, the end of the control can be determined appropriately.

In particular, if the control end condition upon traveling on a high μ road during simple turning (a condition of such a degree that the behavior stability is enhanced a little) is adopted as the control end condition upon traveling on a high μ road during turning for a lane change, then the end of the control is sometimes excessively earlier, and after the control ends once, the behavior stability of the vehicle drops immediately until the control start condition is established again. However, such a malfunction as just described is prevented.

On the other hand, if the control end condition upon traveling on a low μ road upon simple turning (a condition with which the behavior stability is enhanced sufficiently) is adopted as the control end condition upon traveling on a low μ road during turning for a lane change, then the control continues operative for an unnecessarily long period of time and this gives rise to such a malfunction that the vehicle is slowed down unnecessarily. However, also such a malfunction as just described can be prevented.

Second Embodiment

Figure 13:
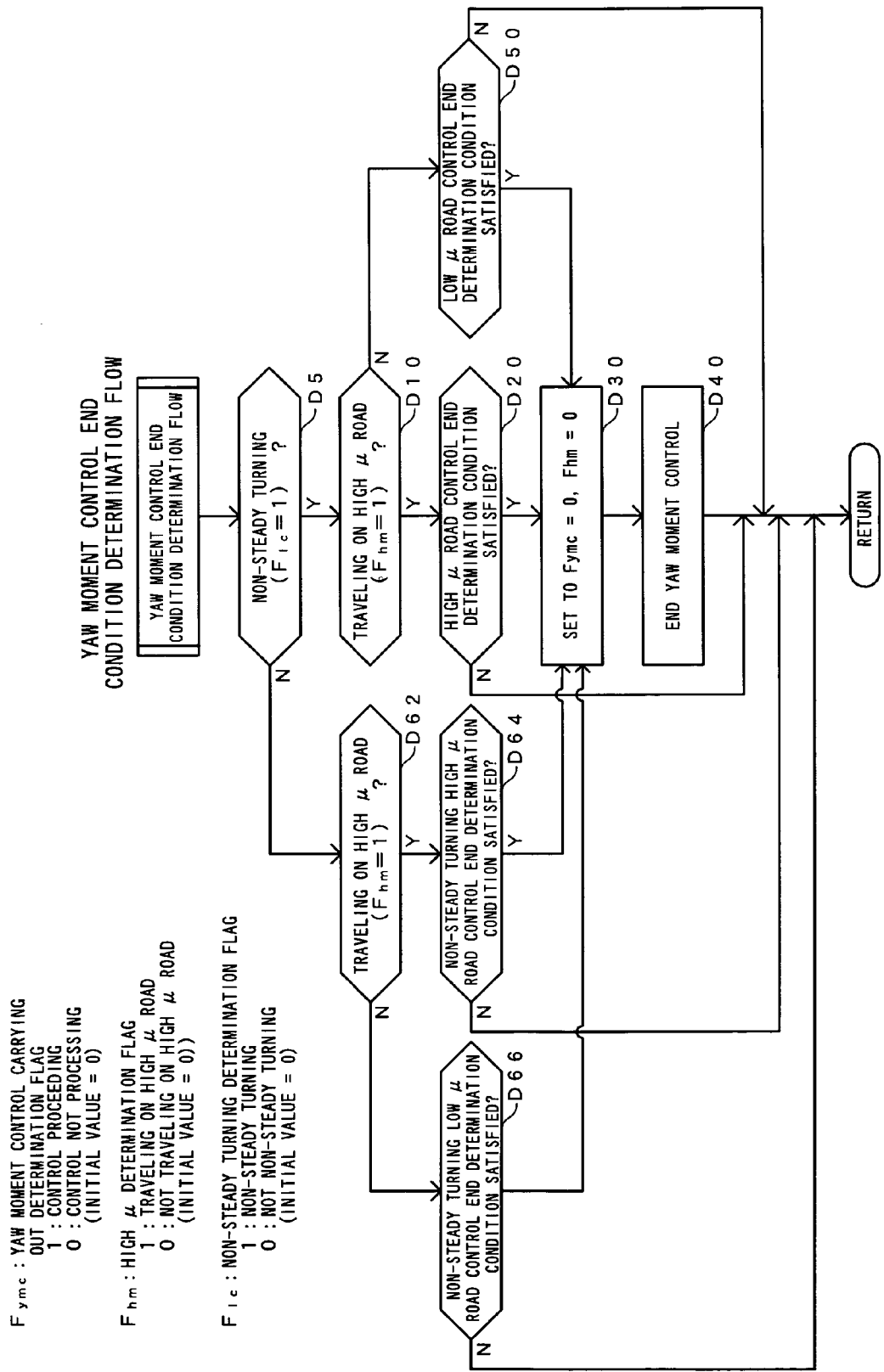
FIG. 13 is a control flow chart illustrating a procedure for determining an end condition of the steering characteristic control by a steering characteristic control apparatus for a vehicle according to a second embodiment of the present invention.

FIG. 13 is a flow chart of a control process for determining an end condition of steering characteristic control by a steering characteristic control apparatus for a vehicle according to a second embodiment of the present invention.

The present embodiment is configured similarly to the first embodiment except that it is different in a control end condition (control end criterion) when turning of the vehicle is non-steady turning such as turning for a lane change.

In particular, while the first embodiment uses the non-steady turning control end condition (control end criterion) commonly to a high μ road and a low μ road irrespective of the road surface μ, according to the present embodiment, also the non-steady turning control end condition (control end criterion) is set differently depending upon the road surface. In particular, a non-steady turning high μ road control end reference value $Y_{elchm}$ for a high μ road and a non-steady turning low μ road control end reference value $Y_{elclm}$ for a low μ road are used for the non-steady turning control end condition (control end criterion).

Naturally, both of the non-steady turning high μ road control end reference value $Y_{elchm}$ and the non-steady turning low μ road control end reference value $Y_{elclm}$ are set lower than the high μ road control end reference value $Y_{ehm}$ for steady turning but higher than the low μ road control end reference value $Y_e$ for steady turning, and the non-steady turning high μ road control end reference value $Y_{elchm}$ is set higher than the non-steady turning low μ road control end reference value $Y_{elclm}$ ($Y_e < Y_{elclm} < Y_{elchm} < Y_{ehm}$).

Also the non-steady turning determination time $T_{elc}$ is set differently depending upon the road surface. In particular, a non-steady turning high μ road determination time $T_{elchm}$ for a high μ road and a non-steady turning low μ road determination time $T_{elclm}$ for a low μ road are used. The non-steady turning high μ road determination time $T_{elchm}$ and the non-steady turning low μ road determination time $T_{elclm}$ are set shorter than the low μ road determination time $T_e$ but longer than the high μ road determination time $T_{chm}$ and the non-steady turning high μ road determination time $T_{elchm}$ is set shorter than the non-steady turning low μ road determination time $T_{elclm}$ ($T_{ehm} < T_{elchm} < T_{elelm} < T_e$).

In the steering characteristic control apparatus for a vehicle of the present embodiment having such a configuration as described above, as seen from FIG. 13, when turning of the vehicle is non-steady turning such as turning for a lane change, it is determined at step D62 whether or not the road surface is a high μ road. If the road surface is a high μ road, then the processing advances to step D64, at which it is determined whether or not the non-steady turning high μ road determination condition (determination reference) is satisfied. On the other hand, if the road surface is a low μ road at step D62, then the processing advances to step D66, at which it is determined whether or not the non-stage turning low μ road determination condition (determination reference) is satisfied.

If the control end determination condition is satisfied at step D64 or D66, then the yaw moment control carrying out determination flag $F_{ymc}$ is set to $F_{ymc}=0$ and the high μ road determination flag $F_{hm}$ is set to $F_{hm}=0$ at step D30, whereafter the processing advances to step D40, at which the yaw moment control is ended, and the process in the flow is ended therewith. However, if the control end determination condition is not satisfied at step D64 or D66, then the process of the flow is ended immediately without ending the yaw moment control.

Except the control described above, the steering characteristic control apparatus for a vehicle of the present embodiment executes the same control as that of the steering characteristic control apparatus for a vehicle of the first embodiment.

Consequently, determination of an end of the control when the turning of the vehicle is non-steady turning such as turning for a lane change can be performed more appropriately than that in the first embodiment.

In particular, since the control end condition upon traveling on a high μ road during non-steady turning is set less severe than the control end condition upon traveling of a low μ road but is not set less severe than the control end condition upon traveling on a high μ road during steady turning, while the end of the control is made earlier suitably, such a situation that, after the control ends once, the behavior stability of vehicle drops immediately and the control start condition becomes satisfied again can be prevented, and an appropriate determination of an end the control can be achieved.

Further, since the control end condition upon traveling on a low μ road during non-steady turning is set severer than the control end condition upon traveling of a high μ road but is not set severer than the control end condition upon traveling on a high μ road during steady turning, while such a malfunction that the control continues operative for an excessively long period of time and the vehicle is slowed down unnecessarily can be prevented, the behavior of the vehicle can be stabilized, and an appropriate determination of an end of the control can be achieved.

While preferred embodiments of the present invention have been described above, the present invention is not limited to the embodiments, but can be carried out in various modified forms without departing from the spirit and scope of the present invention.

For example, while, in the embodiments described above, braking force is applied to a wheel to generate a yaw moment for stabilizing the behavior of the vehicle on the vehicle and slow down the vehicle to perform steering characteristic control (yaw moment control) of the vehicle, in such a case that the vehicle behavior deteriorates suddenly, engine output power suppression control may be carried out additionally as occasion demands. This can achieve quick slowdown of the vehicle speed and recover the behavior stability of the vehicle with certainty.

Further, while, in the foregoing description of the embodiments, the yaw moment control is described in detail, it is a possible idea to simultaneously execute some other vehicle behavior control such as roll-over suppression control or automatic slowdown control. In this instance, the steering characteristic control apparatus for a vehicle may be configured such that independent arithmetic operation is performed in a calculation process for each control amount and, at a point of time when braking control is to be performed, the control amounts are added to perform control or may be configured otherwise such that, upon calculation of the sum of control amounts, weighted addition (for example, such arithmetic operation that individual control amounts are added after they are multiplied by individually predetermined coefficients) is performed.

What is claimed is:

1. A steering characteristic control apparatus for a vehicle, comprising:
   a braking mechanism capable of braking left and right wheels of said vehicle separately from each other;
   steering characteristic determination means for estimating a steering characteristic of said vehicle upon turning of said vehicle;
   steering characteristic control means for starting, when it is determined by said steering characteristic determination means that the steering characteristic of said vehicle exhibits an excessive oversteer or understeer state exceeding a control start criterion, steering characteristic control of controlling said braking mechanism so as to apply braking force to one of said left and right wheels to adjust the steering characteristic to the neutral steering side and ending the steering characteristic control when it is determined by said steering characteristic determination means during the steering characteristic control that the steering characteristic of said vehicle is stabilized within a control end criterion on the neutral steering side with respect to the control start criterion;
   road surface μ determination means for determining a road surface μ state of a road surface of the road on which said vehicle travels; and
   turning determination means for determining whether turning of said vehicle is steady turning or non-steady turning represented by a lane change;
   a low μ road control end criterion for being used when it is determined by said turning determination means that the turning of said vehicle is the steady turning and said road surface μ estimation means estimates that the road surface is a low μ road, a high μ road control end criterion for being used when it is determined by said turning determination means that the turning of said vehicle is the steady turning and said road surface μ estimation means estimates that the road surface is a high μ road and a non-steady turning control end criterion for being used when it is determined by said turning determination means that the turning of said vehicle is the non-steady turning being provided as the control end criterion;
   the low μ road control end criterion, high μ road control end criterion and non-steady turning control end criterion having values relating to the vehicle behavior stability;
   the low μ road control end criterion being set to a value higher in the vehicle behavior stability than that of the high μ road control end criterion;
   the non-steady turning control end criterion being set to a value lower in the vehicle behavior stability than that of the low μ road control end criterion but higher in the vehicle behavior stability than that of the high μ road control end criterion.

2. The steering characteristic control apparatus for a vehicle as claimed in claim 1, wherein, as the non-steady turning control end criterion for being used when it is determined by said turning determination means that the turning of said vehicle is the non-steady turning, a non-steady turning low μ road control end criterion for being used when said road surface μ estimation means estimates that the road surface of a low μ road and a non-steady turning high μ road control end criterion for being used when said road surface μ estimation means estimates that the road surface is a high μ road are provided, and said non-steady turning low μ road control end criterion is set to a value higher in the vehicle behavior stability than that of the non-steady turning high μ road control end criterion.

3. The steering characteristic control apparatus for a vehicle as claimed in claim 1, wherein, when said vehicle is in an excessive oversteer state, said steering characteristic control means performs, as the steering characteristic control, oversteer suppression control of controlling said braking mechanism so as to apply braking force to the wheel or wheels on the turning outer wheel side, but when said vehicle is in an excessive understeer state, said steering characteristic control means performs, as the steering characteristic control, understeer suppression control of controlling said braking mechanism so as to apply braking force to the wheel or wheels on the turning inner wheel side.

4. The steering characteristic control apparatus for a vehicle as claimed in claim 3, further comprising:
actual yaw rate detection means for detecting an actual yaw rate of said vehicle;
theoretical yaw rate calculation means for calculating a theoretical yaw rate of said vehicle; and
yaw rate deviation calculation means for subtracting the actual yaw rate detected by said actual yaw rate detection means from the theoretical yaw rate calculated by said theoretical yaw rate calculation means to calculate a yaw rate deviation;
the low μ road control end criterion, high μ road control end criterion and non-steady turning control end criterion being set based on the value of the yaw rate deviation;
said steering characteristic determination means determining the steering characteristic of said vehicle based on the yaw rate deviation.

5. The steering characteristic control apparatus for a vehicle as claimed in claim 4, wherein, for the control start criteria and each of the control end criteria including low μ road control end criterion, high μ road control end criterion and non-steady turning control end criterion, a criterion for an understeer state where the yaw rate deviation is in the positive and another criterion for an oversteer state where the yaw rate deviation is in the negative, and said steering characteristic control means starts the oversteer suppression control when the yaw rate deviation comes to the oversteer side exceeding the control start criterion for the oversteer state and ends the oversteer suppression control when the yaw rate deviation comes to the neutral steer side into the control end criterion for the oversteer state, but starts the understeer suppression control when the yaw rate deviation comes to the understeer side exceeding the control start criterion for the oversteer state and ends the understeer suppression control when the yaw rate deviation comes to the neutral steer side into the control end criterion for the understeer state.

6. The steering characteristic control apparatus for a vehicle as claimed in claim 5, wherein the magnitude of a low μ road control end yaw rate deviation threshold value which corresponds to the low μ road control end criteria for the oversteer state and the understeer state is set smaller than the magnitude of a high μ road control end yaw rate deviation threshold value which corresponds to the high μ road control end criterion, and the magnitude of the non-steady turning control end yaw rate deviation threshold value which correspond to the non-steady turning control end criteria for the oversteer state and the understeer state is set greater than the magnitude of the low μ road control end yaw rate deviation threshold value but smaller than the magnitude of the high μ road control end yaw rate deviation threshold value.

7. The steering characteristic control apparatus for a vehicle as claimed in claim 6, wherein, as the non-steady turning control end criterion for being used when it is determined by said turning determination means that the turning of said vehicle is the non-steady turning, a non-steady turning low μ road control end criterion for being used when said road surface μ estimation means estimates that the road surface of a low μ road and a non-steady turning high μ road control end criterion for being used when said road surface μ estimation means estimates that the road surface is a high μ road are provided, the magnitude of the non-steady turning low μ road control end yaw rate deviation threshold value which corresponds to the non-steady turning low μ road control end criterion is set to a value lower than the magnitude of the non-steady turning high μ road control end yaw rate deviation threshold value which corresponds to the non-steady turning high μ road control end criterion.

8. The steering characteristic control apparatus for a vehicle as claimed in claim 1, further comprising lateral acceleration detection means for detecting a lateral acceleration of said vehicle, said road surface μ estimation means determining that the road surface of the road on which said vehicle travels is a high μ road when a state wherein the lateral acceleration of said vehicle is higher than a high μ road determination threshold value continues for more than a determination time period set in advance under the conditions that the steering characteristic control is proceeding and that said vehicle is not being braked.

9. The steering characteristic control apparatus for a vehicle as claimed in claim 1, wherein it is determined by said turning determination means that the turning of said vehicle is non-steady turning represented by a lane change when said vehicle during turning is steered in the opposite direction to the turning direction of said vehicle.

10. The steering characteristic control apparatus for a vehicle as claimed in claim 1, wherein said steering characteristic control means determines an end of the control under the condition that the control end criteria remain satisfied continuously for a predetermined period of time, and the predetermined period of time where the road surface upon steady turning is a low μ road is set longer than that where the road surface upon steady turning is a high μ road, but the predetermined period of time upon non-steady turning is set shorter than that where the road surface upon steady turning is a low μ road but set longer than that where the road surface upon steady turning is a high μ road.

11. The steering characteristic control apparatus for a vehicle as claimed in claim 1, wherein said steering characteristic control means additionally uses control of suppressing the output power of an engine of said vehicle under a predetermined condition for the steering control.

12. A steering characteristic control method for a vehicle which includes a braking mechanism capable of braking left and right wheels of said vehicle separately from each other, and steering characteristic determination means for estimating a steering characteristic of said vehicle upon turning of said vehicle, wherein steering characteristic control of controlling said braking mechanism so as to apply braking force to one of said left and right wheels to adjust the steering characteristic to the neutral steering side is started when it is determined by said steering characteristic determination means that the steering characteristic of said vehicle exhibits an excessive oversteer or understeer state exceeding a control start criterion and then the steering characteristic control is ended when it is determined by said steering characteristic determination means during the steering characteristic control that the steering characteristic of said vehicle is stabilized within a control end criterion on the neutral steering side with respect to the control start criterion, comprising:

a road surface µ determination step of determining a road surface µ state of a road surface of the road on which said vehicle travels;

a turning determination step of determining whether turning of said vehicle is steady turning or non-steady turning represented by a lane change; and an end determination step of determining, when it is determined at the turning determination step that the turning of said vehicle is the steady turning and it is estimated at the road surface µ estimation step that the road surface is a low µ road, an end of the steering characteristic control using a low µ road control end criterion as the control end criterion, determining, when it is determined at the turning determination step that the turning of said vehicle is the steady turning and it is estimated at the road surface µ estimation step that the road surface is a high µ road, an end of the steering characteristic control using a high µ road control end criterion as the control end criterion, and determining, when it is determined at the turning determination step that the turning of said vehicle is the non-steady turning, an end of the steering characteristic control using a non-steady turning control end criterion as the control end criterion;

the low µ road control end criterion, high µ road control end criterion and non-steady turning control end criterion having values relating to the vehicle behavior stability;

the low µ road control end criterion being set to a value higher in the vehicle behavior stability than that of the high µ road control end criterion;

the non-steady turning control end criterion being set to a value lower in the vehicle behavior stability than that of the low µ road control end criterion but higher in the vehicle behavior stability than that of the high µ road control end criterion.

* * * * *